(12) United States Patent
Tanaka et al.

(10) Patent No.: US 12,542,610 B2
(45) Date of Patent: Feb. 3, 2026

(54) INSTALLATION METHOD OF OPTICAL COMMUNICATION DEVICE AND OPTICAL COMMUNICATION SYSTEM

(71) Applicant: NTT, Inc., Tokyo (JP)

(72) Inventors: Yasunari Tanaka, Musashino (JP); Junichi Kani, Musashino (JP); Hiroo Suzuki, Musashino (JP); Takuya Kanai, Musashino (JP)

(73) Assignee: NTT, Inc., Tokyo (JP)

( * ) Notice: Subject to any disclaimer, the term of this patent is extended or adjusted under 35 U.S.C. 154(b) by 93 days.

(21) Appl. No.: 18/028,414

(22) PCT Filed: Sep. 30, 2020

(86) PCT No.: PCT/JP2020/037087
§ 371 (c)(1),
(2) Date: Mar. 24, 2023

(87) PCT Pub. No.: WO2022/070293
PCT Pub. Date: Apr. 7, 2022

(65) Prior Publication Data
US 2023/0361876 A1 Nov. 9, 2023

(51) Int. Cl.
*H04B 10/25* (2013.01)
*H04B 10/40* (2013.01)
(52) U.S. Cl.
CPC ......... *H04B 10/2589* (2020.05); *H04B 10/40* (2013.01)

(58) Field of Classification Search
CPC .. H04B 10/2589; H04B 10/40; G02B 6/4246; G02B 6/02042
See application file for complete search history.

(56) References Cited

U.S. PATENT DOCUMENTS 4,217,488 A * 8/1980 Hubbard ................ H04Q 11/04
398/189
6,694,099 B2 * 2/2004 Chraplyvy ........ H04J 14/02216
398/79

(Continued)

FOREIGN PATENT DOCUMENTS

EP 3605879 B1 * 6/2021 ......... H04B 10/2507
JP 2008083278 A 4/2008
(Continued)

*Primary Examiner* — Pranesh K Barua

(57) ABSTRACT

An optical communication system includes: an optical fiber including a plurality of cores; a first optical communication device provided with an optical transmission unit and an optical reception unit each connected to one end of one of the cores on an interface surface; and a second optical communication device provided with an optical transmission unit and an optical reception unit each connected to another end of any one of the cores on an interface surface, in which one of the connection ends of the first optical communication device and of the second optical communication device being in a line-symmetric positional relationship with respect to a vertical line to a horizontal plane of when the first optical communication device and the second optical communication device are installed on the horizontal plane such that the interface surfaces of the first optical communication device and the second optical communication device face a front.

8 Claims, 14 Drawing Sheets

(56) References Cited

U.S. PATENT DOCUMENTS

| | | | |
|---|---|---|---|
| 7,376,293 B2* | 5/2008 | Murphy | H04B 10/85 |
| | | | 398/28 |
| 10,615,868 B2* | 4/2020 | Oda | H04J 14/0201 |
| 10,784,969 B2* | 9/2020 | Weiner | H04B 10/85 |
| 2003/0011838 A1* | 1/2003 | Sasaki | H04J 14/005 |
| | | | 398/43 |
| 2013/0129292 A1* | 5/2013 | Sasaoka | G02B 6/4246 |
| | | | 385/126 |
| 2016/0365926 A1* | 12/2016 | Winzer | G02B 6/00 |
| 2017/0207596 A1* | 7/2017 | Zhang | H04B 10/541 |
| 2018/0224613 A1* | 8/2018 | Goi | G02B 6/28 |
| 2024/0004139 A1* | 1/2024 | Weiner | H04J 14/0227 |

FOREIGN PATENT DOCUMENTS

| | | | |
|---|---|---|---|
| JP | 2008090093 A | 4/2008 | |
| WO | WO-2013069541 A1 | 5/2013 | |

* cited by examiner

INSTALLATION METHOD OF OPTICAL COMMUNICATION DEVICE AND OPTICAL COMMUNICATION SYSTEM

CROSS-REFERENCE TO RELATED APPLICATIONS

This application is a 371 U.S. National Phase of International Application No. PCT/JP2020/037087, filed on Sep. 30, 2020. The entire disclosure of the above application is incorporated herein by reference.

TECHNICAL FIELD

The present invention relates to an installation method of an optical communication device and an optical communication system.

BACKGROUND ART

FIG. 13 is a block diagram illustrating a configuration of a general optical communication system 600 that performs bidirectional communication using a single-core optical fiber 500. The optical fiber 500 includes one core and connects two optical transceivers 200 and 300 to each other.

In the optical transceiver 200, an optical transmission unit 201 converts an electrical signal provided from the outside into an optical signal having a wavelength of 1.5 μm and sends out the optical signal. A multiplexer/demultiplexer 220 sends out the optical signal sent out by the optical transmission unit 201 to the optical fiber 500. The multiplexer/demultiplexer 220 demultiplexes an optical signal of 1.3 μm received through the optical fiber 500 and sends out the demultiplexed optical signal to an optical reception unit 202. The optical reception unit 202 receives the optical signal having a wavelength of 1.3 μm demultiplexed by the multiplexer/demultiplexer 220. The optical reception unit 202 converts the received optical signal into an electrical signal and outputs the electrical signal to the outside.

In the optical transceiver 300, an optical transmission unit 301 converts an electrical signal provided from the outside into an optical signal having a wavelength of 1.3 μm and sends out the optical signal. A multiplexer/demultiplexer 320 sends out the optical signal sent out by the optical transmission unit 301 to the optical fiber 500. The multiplexer/demultiplexer 320 demultiplexes an optical signal of 1.5 μm received through the optical fiber 500 and sends out the demultiplexed optical signal to an optical reception unit 302. The optical reception unit 302 receives an optical signal having a wavelength of 1.5 μm demultiplexed by the multiplexer/demultiplexer 320, converts the received optical signal into an electrical signal, and outputs the electrical signal to the outside.

That is, in the optical communication system 600, to avoid a bit error that occurs due to mutual interference when optical signals having the same wavelength are sent out to the same core, optical signals having two different wavelengths are used, whereby it is possible to perform bidirectional communication using one optical fiber 500 having one core. As a result, there is an advantage that two optical fibers that are normally required can be combined into one for performing bidirectional communication. The optical transceivers 200 and 300 used in such a configuration are referred to as single-core bidirectional optical transceivers (see, for example, Patent Literatures 1 and 2.).

In the case of monitoring operation of the optical transceivers 200 and 300 and an optical transmission path, as illustrated in FIG. 14, an optical communication system 600a is used that includes monitoring optical transmission units 211 and 311 and monitoring optical reception units 212 and 312 that transmit and receive optical signals for monitoring. In the optical communication system 600a, the monitoring optical transmission unit 211 of an optical transceiver 200a sends out an optical signal for monitoring having a wavelength of 1.4 μm, and the monitoring optical reception unit 312 of a transceiver 300a receives the optical signal. The monitoring optical transmission unit 311 of the optical transceiver 300a sends out an optical signal for monitoring having a wavelength of 1.6 μm, and the monitoring optical reception unit 212 of the optical transceiver 200a receives the optical signal.

For that reason, a multiplexer/demultiplexer 220a included in the optical transceiver 200a needs performance of multiplexing the optical signal having a wavelength of 1.5 μm and the optical signal of 1.4 μm and demultiplexing the optical signal of 1.3 μm and the optical signal of 1.6 μm. The multiplexer/demultiplexer 320 included in the optical transceiver 300a needs performance of multiplexing an optical signal of 1.3 μm and an optical signal of 1.6 μm and demultiplexing an optical signal having a wavelength of 1.5 μm and an optical signal of 1.4 μm.

CITATION LIST

Patent Literature

Patent Literature 1: JP 2008-90093 A
Patent Literature 2: JP 2008-83278 A

SUMMARY OF INVENTION

Technical Problem

As illustrated in FIG. 13, in a system of the conventional single-core bidirectional optical transceiver, at least two types of optical transceivers 200 and 300 are required that transmit optical signals of different wavelengths, and the optical transceivers 200 and 300 need to include multiplexers/demultiplexers 220 and 320, respectively.

As illustrated in FIG. 14, in a case where monitoring is performed, it is necessary to include the monitoring optical transmission units 211 and 311 each sending out an optical signal having a wavelength different from that of a main signal. In this case, the optical transceivers 200a and 300a send out optical signals of two different wavelengths, and there is a problem that the optical transceivers 200a and 300a that send out optical signals of a plurality of types of wavelengths in this manner leads to high cost. In this case, the multiplexers/demultiplexers 220a and 320a corresponding to the wavelength of the main signal and the wavelength of the optical signal for monitoring are required, and this also causes an increase in cost.

In view of the above circumstances, an object of the present invention is to provide a technology capable of performing bidirectional communication at low cost while reducing wavelengths to be used in a case where bidirectional communication is performed using an optical communication device such as an optical transceiver.

Solution to Problem

One aspect of the present invention is an installation method of an optical communication device in an optical communication system including: an optical fiber including a plurality of cores formed in parallel to a longitudinal direction; a first optical communication device including an optical transmission unit and an optical reception unit and provided with connection ends of the optical transmission unit and the optical reception unit on an interface surface; and a second optical communication device including an optical transmission unit and an optical reception unit and provided with connection ends of the optical transmission unit and the optical reception unit on an interface surface, in which the connection ends are provided in the first optical communication device and the second optical communication device in an arrangement in which a type of transmission and reception of one of the connection ends of the first optical communication device and a type of transmission and reception of one of the connection ends of the second optical communication device are a transmission and reception pair, the one of the connection ends of the first optical communication device and the one of the connection ends of the second optical communication device being in a line-symmetric positional relationship with respect to a vertical line to a horizontal plane of when the first optical communication device and the second optical communication device are installed on the horizontal plane such that the interface surfaces of the first optical communication device and the second optical communication device face a front, the method including: connecting the connection ends of the first optical communication device to one ends of the cores different from each other; and installing the second optical communication device at a position facing the first optical communication device, and connecting, to other ends of the cores, connection ends of the second optical communication device that are transmission and reception pairs to the connection ends connected to the one ends of the cores.

One aspect of the present invention is an optical communication system including: an optical fiber including a plurality of cores formed in parallel to a longitudinal direction; a first optical communication device including an optical transmission unit and an optical reception unit, and provided with connection ends of the optical transmission unit and the optical reception unit each connected to one end of any one of the cores on an interface surface; and a second optical communication device including an optical transmission unit and an optical reception unit, and provided with connection ends of the optical transmission unit and the optical reception unit each connected to another end of any one of the cores on an interface surface, in which the connection ends are provided in an arrangement in which a type of transmission and reception of one of the connection ends of the first optical communication device and a type of transmission and reception of one of the connection ends of the second optical communication device are a transmission and reception pair, the one of the connection ends of the first optical communication device and the one of the connection ends of the second optical communication device being in a line-symmetric positional relationship with respect to a vertical line to a horizontal plane of when the first optical communication device and the second optical communication device are installed on the horizontal plane such that the interface surfaces of the first optical communication device and the second optical communication device face a front.

Advantageous Effects of Invention

According to the present invention, in a case where bidirectional communication is performed using an optical communication device such as an optical transceiver, it becomes possible to perform bidirectional communication at low cost while reducing wavelengths to be used.

DESCRIPTION OF EMBODIMENTS

First Embodiment

Figure 1:
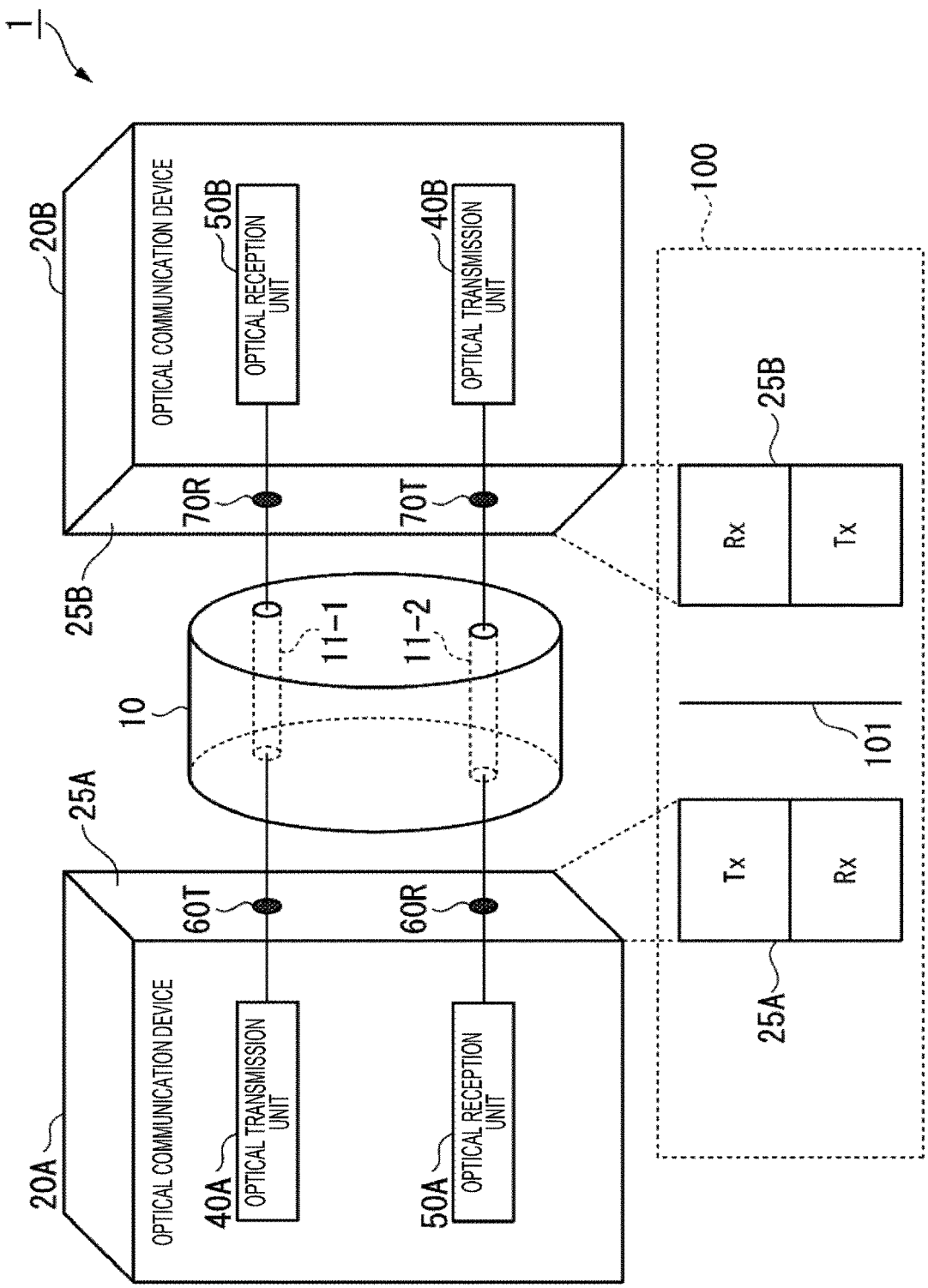
FIG. 1 is a block diagram illustrating a configuration of an optical communication system of a first embodiment.

Hereinafter, an embodiment of the present invention will be described with reference to the drawings. FIG. 1 is a block diagram illustrating a configuration of an optical communication system 1 according to a first embodiment. The optical communication system 1 includes an optical communication device 20A, an optical communication device 20B, and an optical fiber 10. The optical fiber 10 is a multicore fiber including two cores 11-1 and 11-2 formed in parallel in an untwisted state with respect to the longitudinal direction of the optical fiber 10.

The optical communication devices 20A and 20B are, for example, optical transceivers. The optical communication device 20A includes an optical transmission unit (optical transmitter) 40A and an optical reception unit (optical receiver) 50A. The optical communication device 20B includes an optical reception unit (optical receiver) 50B and an optical transmission unit (optical transmitter) 40B. The optical transmission units 40A and 40B convert an electrical signal of a data signal provided from the outside into an optical signal having a predetermined wavelength and send out the optical signal. The optical reception units 50A and 50B receive the optical signal, convert the received optical signal into an electrical signal, and output the electrical signal of the data signal obtained by conversion to the outside.

The optical transmission unit 40A of the optical communication device 20A is connected to one end of the core 11-1 through a connection end 60T provided on an interface surface 25A of the optical communication device 20A. The optical reception unit 50B of the optical communication device 20B is connected to the other end of the core 11-1 through a connection end 70R provided on an interface surface 25B of the optical communication device 20B.

The optical reception unit 50A of the optical communication device 20A is connected to one end of the core 11-2 through a connection end 60R provided on the interface surface 25A of the optical communication device 20A. The optical transmission unit 40B of the optical communication device 20B is connected to the other end of the core 11-2 through a connection end 70T provided on the interface surface 25B of the optical communication device 20B.

The optical signal of the data signal sent out by the optical transmission unit 40A of the optical communication device 20A is transmitted by the core 11-1, and the optical reception unit 50B of the optical communication device 20B receives the optical signal of the data signal transmitted by the core 11-1. The optical signal of the data signal sent out by the optical transmission unit 40B of the optical communication device 20B is transmitted by the core 11-2, and the optical reception unit 50A of the optical communication device 20A receives the optical signal of the data signal transmitted by the core 11-2. In this manner, bidirectional communication of data signals becomes possible in the optical communication system 1.

A diagram illustrated in a dotted-line box indicated by a reference numeral 100 is a diagram in a case where the optical communication devices 20A and 20B are installed on a horizontal plane such that the interface surfaces 25A and 25B of the respective optical communication devices 20A and 20B face the front. In the figure, "Tx" indicates the connection ends 60T and 70T of a type for transmitting the optical signal of the data signal, and "Rx" indicates the connection ends 60R and 70R of a type for receiving the optical signal of the data signal.

Here, a vertical line 101 is assumed that is perpendicular to the horizontal plane at a middle position between the interface surfaces 25A and 25B. The types of transmission and reception between the connection end 60T of the interface surface 25A and the connection end 70R of the interface surface 25B that are in a line-symmetric positional relationship with respect to the vertical line 101 are "Tx" and "Rx", and there is a relationship of a transmission and reception pair (hereinafter, referred to as a "transmission and reception pair".). In addition. The types of transmission and reception between the connection end 60R of the interface surface 25A and the connection end 70T of the interface surface 25B that are in a line-symmetric positional relationship with respect to the vertical line 101 are "Rx" and "Tx", and there is a relationship of a transmission and reception pair.

As described above, in a case where the cores 11-1 and 11-2 use the optical fiber 10 of a multicore fiber formed in parallel in an untwisted state with respect to the longitudinal direction of the optical fiber 10, bidirectional communication can be performed if a type of transmission and reception (hereinafter referred to as a "type of transmission and reception".) of the connection end (60T, 60R) of the optical communication device 20A and a type of transmission and reception of the connection end (70R, 70T) of the optical communication device 20B are a transmission and reception pair, in which the connection end (60T, 60R) of the optical communication device 20A and the connection end (70R, 70T) of the optical communication device 20B are in a line-symmetric positional relationship with respect to the vertical line 101.

According to the configuration of the first embodiment described above, in a case where an optical signal is transmitted from the optical communication device 20A to the optical communication device 20B, the core 11-1 is used, and in a case where an optical signal is transmitted from the optical communication device 20B to the optical communication device 20A, the core 11-2 is used that is different from the core 11-1. For that reason, the optical communication devices 20A and 20B do not need to include a multiplexer/demultiplexer. Since the optical transmission unit 40A of the optical communication device 20A and the optical transmission unit 40B of the optical communication device 20B send out optical signals to the different cores 11-1 and 11-2, the optical signals in both directions do not interfere with each other, and the optical transmission unit 40A and the optical transmission unit 40B can send out optical signals having the same wavelength. For that reason, the wavelengths of the optical signals transmitted and received in the optical communication system 1 can be one wavelength.

A case is assumed where the optical reception unit 50A of the optical communication device 20A is configured to be able to receive the optical signal sent out by the optical transmission unit 40A of the optical communication device 20A, in other words, a case is assumed where the optical reception unit 50A has performance capable of detecting light having a wavelength of the optical signal sent out by the optical transmission unit 40A, and the optical transmission unit 40A and the optical reception unit 50A are a transmission and reception pair. In this case, two optical communication devices 20A are prepared, and one optical communication device 20A is installed at an opposite position, whereby the one optical communication device 20A can be used as the optical communication device 20B. For that reason, it is sufficient that two identical products are manufactured and it is indicated, in a manual or the like, for example, that one product is rotated by 180 degrees with respect to the other product and installed at an opposite position, and thus it is possible to suppress the manufacturing cost. Thus, in the optical communication system 1, it is possible to perform bidirectional communication at low cost while reducing the wavelengths to be used as compared with the conventional optical communication system.

Second Embodiment

Figure 2:
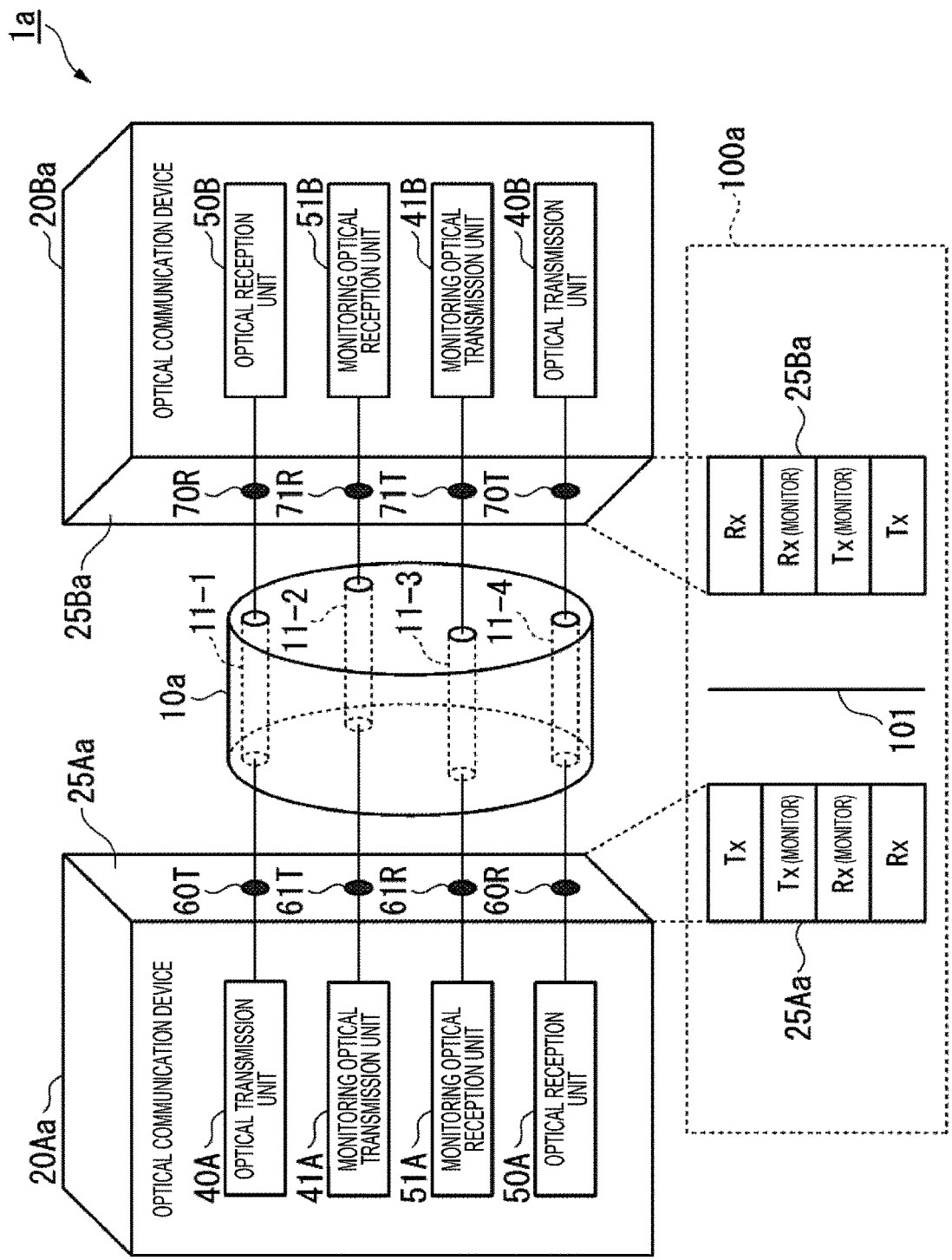
FIG. 2 is a block diagram illustrating a configuration of an optical communication system of a second embodiment.

FIG. 2 is a block diagram illustrating a configuration of an optical communication system 1a according to a second embodiment. In the second embodiment, the same components as those in the first embodiment are denoted by the same reference numerals, and different components will be described below.

The optical communication system 1a includes an optical communication device 20Aa, an optical communication device 20Ba, and an optical fiber 10a. The optical fiber 10a is a multicore fiber having four cores 11-1, 11-2, 11-3, and 11-4 formed in parallel in an untwisted state with respect to the longitudinal direction of the optical fiber 10a.

The optical communication devices 20Aa and 20Ba are, for example, optical transceivers. The optical communication device 20Aa includes an optical transmission unit 40A, a monitoring optical transmission unit 41A, a monitoring optical reception unit 51A, and an optical reception unit 50A. The optical communication device 20B includes an optical reception unit 50B, a monitoring optical reception unit 51B, a monitoring optical transmission unit 41B, and an optical transmission unit 40B. The monitoring optical transmission units 41A and 41B generate and send out an optical signal for monitoring at a predetermined wavelength. The monitoring optical reception units 51A and 51B receive the optical signal for monitoring.

For example, each of the optical communication devices 20Aa and 20Ba includes a monitoring control unit therein, the monitoring optical transmission unit 41A and the monitoring optical reception unit 51A are connected to the monitoring control unit of the optical communication device 20Aa, and the monitoring optical transmission unit 41B and the monitoring optical reception unit 51B are connected to the monitoring control unit of the optical communication device 20Ba. The two facing monitoring control units take in optical signals for monitoring transmitted bidirectionally, and perform monitoring of operation of the optical communication devices 20Aa and 20Ba and optical transmission paths on the basis of the optical signals for monitoring taken in.

The optical transmission unit 40A of the optical communication device 20Aa is connected to one end of the core 11-1 through a connection end 60T provided on an interface surface 25Aa of the optical communication device 20Aa. The optical reception unit 50B of the optical communication device 20Ba is connected to the other end of the core 11-1 through a connection end 70R provided on an interface surface 25Ba of the optical communication device 20Ba.

The monitoring optical transmission unit 41A of the optical communication device 20Aa is connected to one end of the core 11-2 through a connection end 61T provided on the interface surface 25Aa of the optical communication device 20Aa. The monitoring optical reception unit 51B of the optical communication device 20Ba is connected to the other end of the core 11-2 through a connection end 71R provided on the interface surface 25Ba of the optical communication device 20Ba.

The monitoring optical reception unit 51A of the optical communication device 20Aa is connected to one end of the core 11-3 through a connection end 61R provided on the interface surface 25Aa of the optical communication device 20Aa. The monitoring optical transmission unit 41B of the optical communication device 20Ba is connected to the other end of the core 11-3 through a connection end 71T provided on the interface surface 25Ba of the optical communication device 20Ba.

The optical reception unit 50A of the optical communication device 20Aa is connected to one end of the core 11-4 through a connection end 60R provided on the interface surface 25Aa of the optical communication device 20Aa. The optical transmission unit 40B of the optical communication device 20Ba is connected to the other end of the core 11-4 through a connection end 70T provided on the interface surface 25Ba of the optical communication device 20Ba.

As a result, similarly to the first embodiment, transmission and reception of the optical signal of the data signal are performed between the optical transmission unit 40A and the optical reception unit 50B and between the optical transmission unit 40B and the optical reception unit 50A, so that bidirectional communication of the data signal can be performed in the optical communication system 1a. In the optical communication system 1a, transmission and reception of the optical signals for monitoring are bidirectionally performed between the monitoring optical transmission unit 41A and the monitoring optical reception unit 51B and between the monitoring optical transmission unit 41B and the monitoring optical reception unit 51A.

A diagram illustrated in a dotted-line box indicated by a reference numeral 100a is a diagram in a case where the optical communication devices 20Aa and 20Ba are installed on a horizontal plane such that the interface surfaces 25Aa and 25Ba of the respective optical communication devices 20Aa and 20Ba face the front. In the figure, "Tx" indicates the connection ends 60T and 70T of a type for transmitting the optical signal of the data signal, and "Rx" indicates the connection ends 60R and 70R of a type for receiving the optical signal of the data signal. "Tx (monitor)" indicates the connection ends 61T and 71T of a type for transmitting the optical signal for monitoring, and "Rx (monitor)" indicates the connection ends 61R and 71R of a type for receiving the optical signal for monitoring.

Here, as in the first embodiment, a vertical line 101 perpendicular to the horizontal plane is assumed at a middle position between the interface surfaces 25Aa and 25Ba. The types of transmission and reception of the connection ends 60T, 61T, 61R, and 60R of the interface surface 25Aa and the types of transmission and reception of the connection ends 70R, 71R, 71T, and 70T of the interface surface 25Ba are all respectively transmission and reception pairs, in which the connection ends 60T, 61T, 61R, and 60R of the interface surface 25Aa and the connection ends 70R, 71R, 71T, and 70T of the interface surface 25Ba are in a line-symmetric positional relationship with respect to the vertical line 101. That is, the connection end 60T and the connection end 70R in the first row, and the connection end 60R and the connection end 70T in the fourth row are transmission and reception pairs of the optical signal of the data signal. The connection end 61T and the connection end 71R in the second row, and the connection end 61R and the connection end 71T in the third row are transmission and reception pairs of the optical signal for monitoring.

Figure 3:
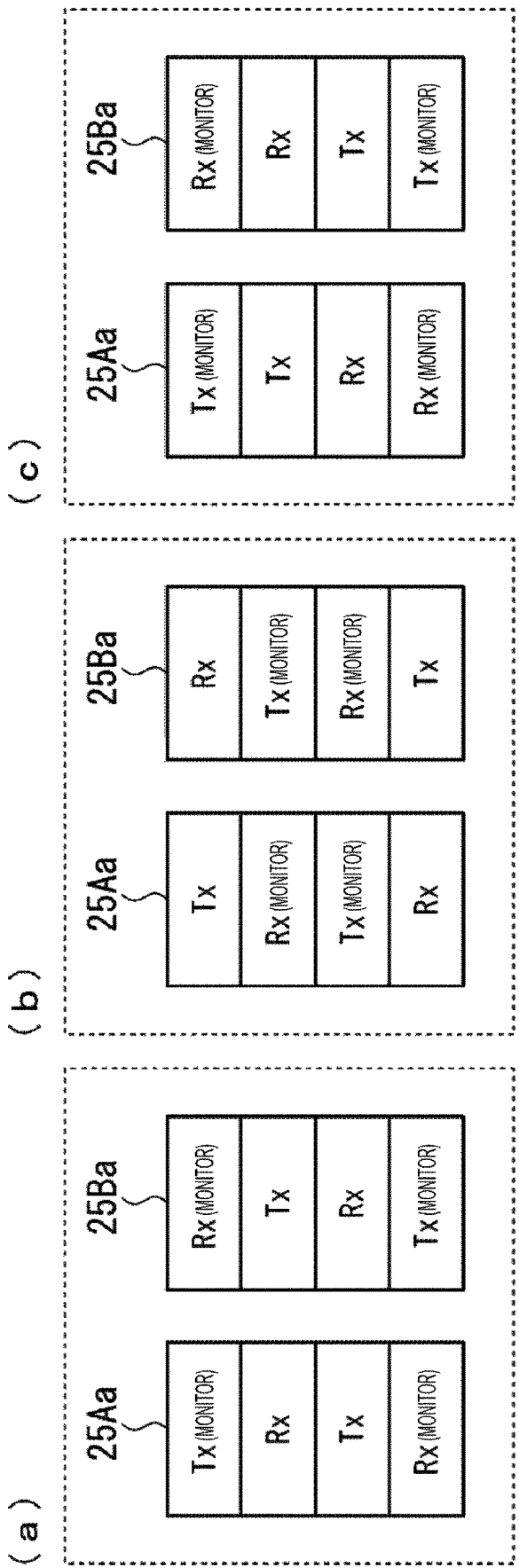
FIG. 3 is a diagram illustrating an arrangement pattern of connection ends on an interface surface of an optical communication device of the second embodiment.

As other patterns in which the connection ends that are at line-symmetric positions with respect to the vertical line 101 are a transmission and reception pair on the interface surfaces 25Aa and 25Ba as described above, there are other three patterns as illustrated in FIGS. 3(a) to 3(c), and there are four patterns in total.

As can be seen from these four patterns, two optical communication devices 20Aa are prepared, and one optical communication device 20Aa is installed at an opposite position, whereby the one optical communication device 20Aa can be used as the optical communication device 20Ba. However, it is on the premise that the optical transmission unit 40A and the optical reception unit 50A of the optical communication device 20Aa axe a transmission and reception pair, that is, the optical reception unit 50A can receive the optical signal sent out by the optical transmission unit 40A, and the monitoring optical transmission unit 41A and the monitoring optical reception unit 51A of the optical communication device 20Aa are a transmission and reception pair, that is, the monitoring optical reception unit 51A can receive the optical signal sent out by the monitoring optical transmission unit 41A.

A feature of these four patterns is that, in each of the interface surfaces 25Aa and 25Ba, a combination of connection ends of the first row and the fourth row and a combination of connection ends of the second row and the third row are transmission and reception pairs.

(Generalization of Arrangement of Connection Ends on Interface Surface)

The arrangement pattern of the connection ends described above can be expressed in a generalized manner as described below. For the sake of generalization, it is assumed that the optical fiber 10a includes M cores 11-1, 11-2, . . . , and 11-M. Here, M is an even number, and is represented as M=2K, where K is an integer of greater than or equal to 1.

(Case Where Type of Transmission and Reception is One Type)

For ease of description, it is assumed that the type of the optical signal to be transmitted and received is one type of the optical signal of the data signal, the optical communication device 20Aa includes K optical transmission units 40A and K optical reception units 50A, and the optical communication device 20Ba includes K optical transmission units 40B and K optical reception units 50B. The optical transmission units 40A and 40B have the same configuration. The optical reception units 50A and 50B have the same configuration, and it is assumed that each of the optical reception units 50A and 50B can receive the optical signal sent out by both the optical transmission units 40A and 40B.

In this case, each of the interface surfaces 25Aa and 25Ba is provided with connection ends of M rows×1 column. Here, a pair of the connection ends of which the sum of the row numbers is M+1, that is, 2K+1 includes, for example, K combinations of which row number combinations are (1, 2K), (2, 2K−1), . . . , and (K, K+1). On the interface surface 20Aa of the optical communication device 25Aa, all types of connection ends of these pairs are configured to be transmission and reception pairs, that is, pairs of "Tx" and "Rx".

When the optical communication device 20Aa configured as described above is reversely installed as the optical communication device 20Ba, the types of transmission and reception of the connection ends on the interface surface 25Aa and the types of transmission and reception of the connection ends on the interface surface 25Ba are all transmission and reception pairs, in which the connection ends on the interface surface 25Aa and the connection ends on the interface surface 25Ba are in a line-symmetric positional relationship with respect to the vertical line 101.

The number of pairs is $2^K$ since each of (1, 2K), (2, 2K−1), . . . , and (K, K+1) can select two patterns of (Tx, Rx) and (Rx, Tx). From the $2^K$ patterns, it is necessary to remove a half of the patterns in which the combination of the pattern of the optical communication device 20Aa and the pattern of the optical communication device 20Ba is only reversed. For example, in the case of M=4, that is, K=2, there are four patterns of (Tx, Tx, Rx, Rx), (Tx, Rx, Tx, Rx), (Rx, Tx, Rx, Tx), and (Rx, Rx, Tx, Tx).

In a case where the first (Tx, Tx, Rx, Rx) is selected as the pattern of the optical communication device 20Aa, the pattern of the optical communication device 20Ba is the same as the fourth (Rx, Rx, Tx, Tx). For that reason, when the fourth (Rx, Rx, Tx, Tx) is set as the pattern of the optical communication device 20Aa, the first (Tx, Tx, Rx, Rx) is the pattern of the optical communication device 20Ba, and it is the same pattern as that of when the left and right of the installation positions are interchanged, that is, the pattern in which the left and right of the installation positions are only reversed. For that reason, the fourth (Rx, Rx, Tx, Tx) cannot be set as the pattern of the optical communication device 20Aa.

Similarly, in a case where the second (Tx, Rx, Tx, Rx) is selected as the pattern of the optical communication device 20Aa, the pattern of the optical communication device 20Ba is the same as the third (Rx, Tx, Rx, Tx). For that reason, when the third (Rx, Tx, Rx, Tx) is set as the pattern of the optical communication device 20Aa, the pattern is only reversed similarly to the above, and thus the third (Rx, Tx, Rx, Tx) cannot be set as the pattern of the optical communication device 20Aa. Thus, the total number of patterns of arrangement of connection ends that can be taken on the interface surface 25Aa of the optical communication device 20Aa is $2^K/2=2^{K-1}$.

(Case Where Type of Transmission and Reception is K)

On the other hand, a case will be described in which the type of transmission and reception for transmitting and receiving the optical signal for monitoring such as the monitoring optical transmission units 41A and 41B and the monitoring optical reception units 51A and 51B, and the type of transmission and reception for transmitting and receiving the optical signal of the data signal such as the optical transmission units 40A and 40B and the optical reception units 50A and 50B are mixed. Here, it is assumed that there are K types of transmission and reception, and to distinguish combinations of individual types of transmission and reception, they are expressed as (Tx1, Rx1), (Tx2, Rx2), . . . .

As combinations that can be taken by (1, 2K) that is the first pair of the connection ends of which the sum of row numbers is M+1, that is, 2K+1, there are K×2=2K combinations such as (Tx1, Rx1), (Rx1, Tx1), (Tx2, Rx2), (Rx2, Tx2), . . . , (TxK, RxK), and (RxK, TxK).

Combinations that can be taken by (2, 2K−1) are 2K−2 combinations obtained by excluding combinations of one number adopted in (1, M) from 2K combinations. For example, in a case where the combination of (Tx1, Rx1) or (Rx1, Tx1) is selected in (1, 2K), the remaining 2K−2 of (Tx2, Rx2), (Rx2, Tx2) . . . , (TxK, RxK), and (RxK, TxK) are combinations that can be taken by (2, 2K−1).

When this is repeated until (K, K+1), the number of combinations that can be taken in (K, K+1) is 2K−2×(K−1)=2. Thus, the total number of patterns is 2K×2K−2×2K−4× . . . ×2, and is $K! \times 2^K$. Also in this case, since it is necessary to remove the half of the patterns in which the combination of the pattern of the optical communication device 20Aa and the pattern of the optical communication device 20Ba is only reversed, the total number of patterns finally obtained is $K! \times 2^K/2 = K! \times 2^{K-1}$.

Extended Configuration Example of Second Embodiment

In the second embodiment, the arrangement of the connection ends 60T, 61T, 61R, and 60R on the interface surface 25Aa of the optical communication device 20Aa and the connection ends 70R, 71R, 71T, and 70T on the interface surface 25Ba of the optical communication device 20Ba is developed in the longitudinal direction, that is, in the column direction. As an extended configuration example of the second embodiment, it is assumed that this arrangement is developed also in the lateral direction, that is, the row direction, and the connection ends are provided such that a pair of the connection ends of which the sum of row numbers is M+1 is a transmission and reception pair in each column.

Note that, for convenience of description, two optical communication devices in the extended configuration example of the second embodiment are optical communication devices 20Ab and 20Bb, an optical fiber connecting the optical communication devices 20Ab and 20Bb to each other is an optical fiber 10b, and an optical communication system including the optical communication devices 20Ab and 20Bb and the optical fiber 10b is represented as an optical communication system 1b. The interface surfaces of the optical communication devices 20Ab and 20Bb are represented as interface surfaces 25Ab and 25Bb, respectively.

Figure 4:
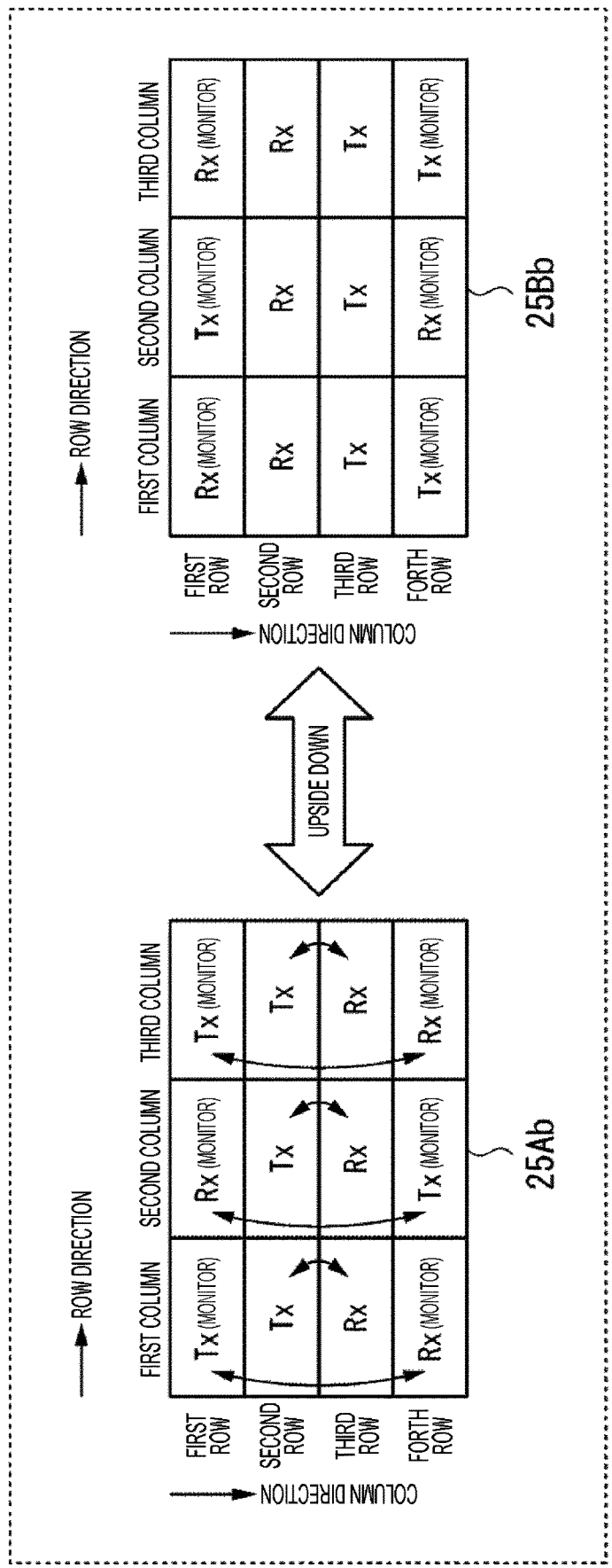
FIG. 4 is a diagram illustrating an arrangement pattern of connection ends of an interface surface of an optical communication device in an extended configuration of the second embodiment.

FIG. 4 is a configuration example of the interface surfaces 25Ab and 25Bb provided with connection ends further to form three columns in the row direction. In this case, M=4, and the optical fiber 10b includes 12 cores 11-1 to 11-12 of 4 rows×3 columns formed in parallel in an untwisted state with respect to the longitudinal direction. As illustrated in the left side diagram of FIG. 4, in each column of the interface surface 25Ab, pairs of the connection ends of which the sum of row numbers is "5" are arranged to be transmission and reception pairs. In this case, as illustrated in the right side diagram of FIG. 4, the optical communication device 20Ab, in which the optical communication device 20Ab is turned upside down and installed at an opposite position, is set as the optical communication device 20Bb, whereby the connection end of the interface surface 25Aa and the connection end of the interface surface 25Bb that are in a line-symmetric positional relationship to the vertical line 101 is a transmission and reception pair.

The extended configuration example of the second embodiment described above is expressed in a generalized manner as follows. That is, M is an even number, N is an integer of greater than or equal to 1, and in the optical fiber 10b, cores of M rows×N columns are formed in parallel in an untwisted state with respect to the longitudinal direction. Connection ends are provided in M rows×N columns on the interface surface 25Ab of the optical communication device 20Ab, and the connection ends are provided such that a pair of the connection ends of which the sum of row numbers is M+1 is a transmission and reception pair. In this case, when a device in which the same device as the optical communication device 20Ab that is turned upside down and installed at an opposite position is set as the optical communication device 20Bb, the type of transmission and reception of the connection end on the interface surface 25Ab of the optical communication device 20Ab and the type of transmission and reception of the connection end on the interface surface 25Bb of the optical communication device 20Bb are a transmission and reception pair, in which the connection end on the interface surface 25Ab and the connection end on the interface surface 25Bb are in a line-symmetric positional relationship to the vertical line 101.

Since the optical signals sent out by the optical communication devices 20Ab and 20Bb are transmitted by the different cores 11-1, 11-2, . . . , the optical communication devices 20Ab and 20Bb do not need to include multiplexers/demultiplexers. Since the optical signals are transmitted by the respective different cores 11-1, 11-2, . . . , the wavelengths of all the optical signals can be the same wavelength. Two optical communication devices 20Ab are prepared, and one optical communication device 20Ab is turned upside down and installed at an opposite position, whereby the one optical communication device 20Ab can be used as the optical communication device 20Bb. For that reason, it is sufficient that two identical products are manufactured and it is indicated, in a manual or the like, for example, that one product is turned upside down, that is, rotated by 180 degrees with respect to the other product and installed at an opposite position, and thus it is possible to suppress the manufacturing cost. Thus, in the optical communication system 1b, it is possible to perform bidirectional communication at low cost while reducing the wavelengths to be used as compared with the conventional optical communication system.

Third Embodiment

Figure 5:
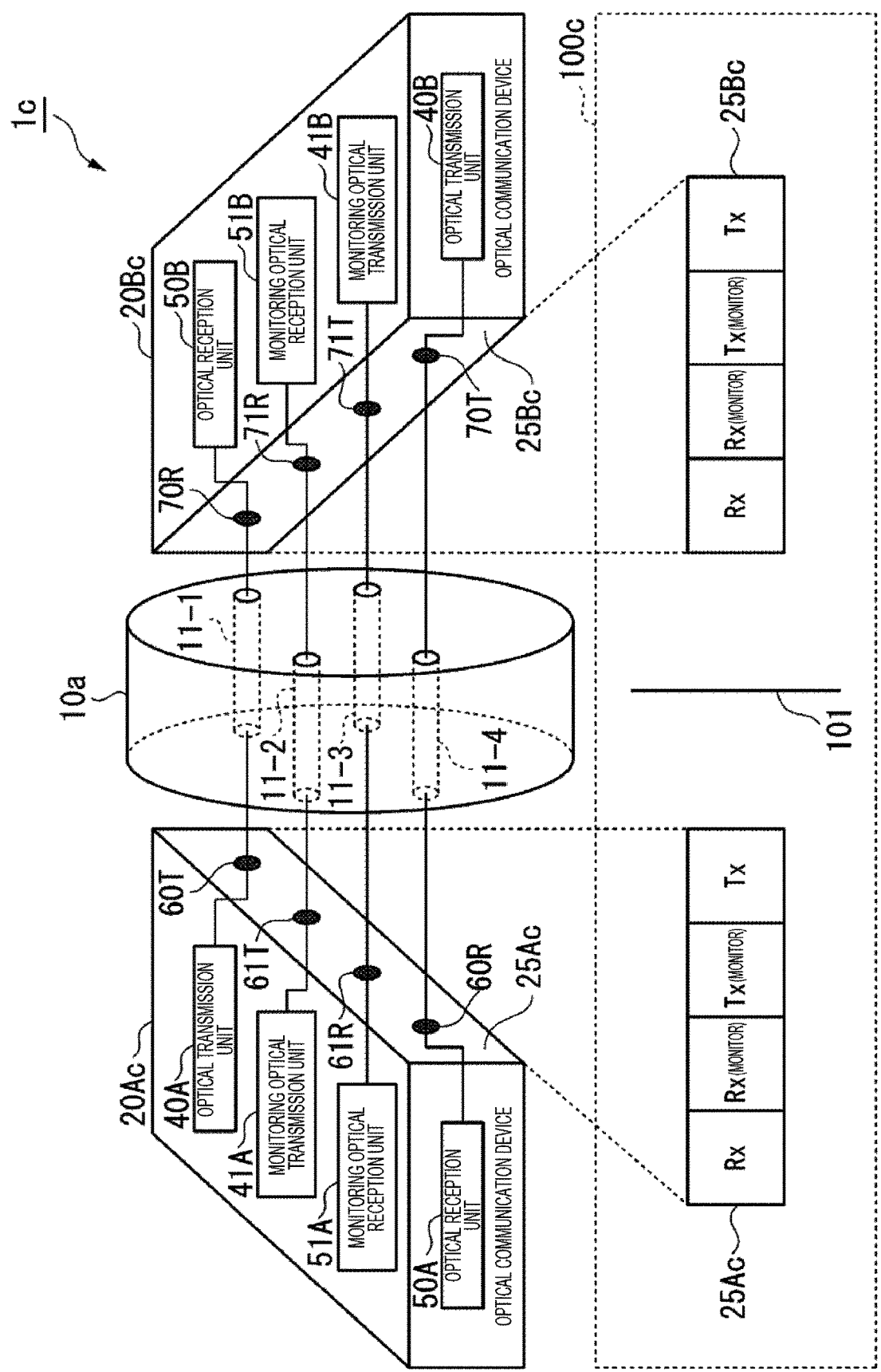
FIG. 5 is a block diagram illustrating a configuration of an optical communication system of a third embodiment.

FIG. 5 is a block diagram illustrating a configuration of an optical communication system 1c according to a third embodiment. In the third embodiment, the same components as those in the first and second embodiments are denoted by the same reference numerals, and different components will be described below.

The optical communication system 1c includes an optical communication device 20Ac, an optical communication device 20Bc, and an optical fiber 10a. The optical communication device 20Ac is one in which the optical communication device 20Aa of the second embodiment is installed to be tilted to the right side as viewed from the optical fiber 10a side. The optical communication device 20Bc is one in which the optical communication device 20Ba of the second embodiment is installed to be tilted to the left side as viewed from the optical fiber 10a side.

Thus, similarly to the optical communication device 20Aa, the optical communication device 20Ac includes an optical transmission unit 40A, a monitoring optical transmission unit 41A, a monitoring optical reception unit 51A, and an optical reception unit 50A. Similarly to the optical communication device 20Aa, the optical communication device 20Bc includes an optical reception unit 50B, a monitoring optical reception unit 51B, a monitoring optical transmission unit 41B, and an optical transmission unit 40B.

As in the second embodiment, a connection end 60T is connected to one end of a core 11-1, and a connection end 70R is connected to the other end of the core 11-1. A connection end 61T is connected to one end of a core 11-2, and a connection end 71R is connected to the other end of the core 11-2. A connection end 61R is connected to one end of a core 11-3, and a connection end 71T is connected to the other end of the core 11-3. A connection end 60R is connected to one end of a core 11-4, and a connection end 70T is connected to the other end of the core 11-4.

As a result, similarly to the second embodiment, transmission and reception of the optical signal of the data signal are performed between the optical transmission unit 40A and the optical reception unit 50B and between the optical transmission unit 40B and the optical reception unit 50A, so that bidirectional communication of the data signal can be performed in the optical communication system 1c. Similarly to the second embodiment, transmission and reception of the optical signals for monitoring are bidirectionally performed between the monitoring optical transmission unit 41A and the monitoring optical reception unit 51B and between the monitoring optical transmission unit 41B and the monitoring optical reception unit 51A.

A diagram illustrated in a dotted-line box indicated by a reference numeral 100c is a diagram in a case where the optical communication devices 20Ac and 20Bc are installed on a horizontal plane such that the interface surfaces 25Ac and 25Ac of the respective optical communication devices 20Ac and 20Bc face the front. Here, a vertical line 101 is assumed that is perpendicular to the horizontal plane at a middle position between the interface surfaces 25Ac and 25Bc. The types of transmission and reception of the connection ends 60T, 61T, 61R, and 60R of the interface surface 25Ac and the types of transmission and reception of the connection ends 70R, 71R, 71T, and 70T of the interface surface 25Bc are all respectively transmission and reception pairs, in which the connection ends 60T, 61T, 61R, and 60R of the interface surface 25Ac and the connection ends 70R, 71R, 71T, and 70T of the interface surface 25Bc are in a line-symmetric positional relationship with respect to the vertical line 101.

That is, the connection end 60T of the fourth column of the interface surface 25Ac and the connection end 70R of the first column of the interface surface 25Bc, and the connection end 60R of the first column of the interface surface 25Ac and the connection end 70T of the fourth column of the interface surface 25Bc are transmission and reception pairs of the optical signal of the data signal. The connection end 61T of the third column of the interface surface 25Ac and the connection end 71R of the second column of the interface surface 25Bc, and the connection end 61R of the second column of the interface surface 25Ac and the connection end 71T of the third column of the interface surface 25Bc are transmission and reception pairs of the optical signal for monitoring.

For that reason, in a case where the optical transmission unit 40A and the optical reception unit 50A of the optical communication device 20Ac are a transmission and reception pair, and the monitoring optical transmission unit 41A and the monitoring optical reception unit 51A of the optical communication device 20Ac are a transmission and reception pair, two optical communication devices 20Ac are prepared and the two optical communication devices 20Ac are installed to face each other, whereby one can be used as the optical communication device 20Bc.

(Generalization of Arrangement of Connection Ends on Interface Surface)

The arrangement pattern of the connection ends described above can be expressed in a generalized manner as described below. For the sake of generalization, it is assumed that the optical fiber 10a includes N cores 11-1, 11-2, . . . , and 11-N. Here, it is assumed that N is an even number. In the interface surface 25Ac of the optical communication device 20Ac, it is assumed that the connection ends are provided such that a pair of the connection ends of which the sum of column numbers is N+1 is a transmission and reception pair. In this case, when a device having the same configuration as the optical communication device 20Ac is installed on a side facing the optical communication device 20Bc, the types of transmission and reception of the connection ends on the interface surface 25Ac and the types of transmission and reception of the connection ends on the interface surface 25Bc are all transmission and reception pairs, in which the connection ends on the interface surface 25Ac and the connection ends on the interface surface 25Bc are in a line-symmetric positional relationship with respect to the vertical line 101. Thus, bidirectional communication can be performed between the optical communication device 20Ac and the optical communication device 20Bc. Note that, similarly to the second embodiment, the total number of patterns of the arrangement of the connection ends is $2^{(N/2)-1}$ in a case where the type of transmission and reception is one type, and is $(N/2)! \times 2^{(N/2)-1}$ in a case where the number of types of transmission and reception is N/2.

Extended Configuration Example of Third Embodiment

In the third embodiment, the arrangement of the connection ends 60T, 61T, 61R, and 60R on the interface surface 25Ac of the optical communication device 20Ac and the connection ends 70R, 71R, 71T, and 70T on the interface surface 25Bc of the optical communication device 20Bc is developed in the lateral direction, that is, in the row direction. As an extended configuration example of the third embodiment, this arrangement is developed also in the longitudinal direction, that is, the column direction, and the connection ends are provided such that a pair of the connection ends of which the sum of column numbers is N+1 is a transmission and reception pair in each row.

Note that, for convenience of description, two optical communication devices in the extended configuration example of the third embodiment are optical communication devices 20Ad and 20Bd, an optical fiber connecting the optical communication devices 20Ad and 20Bd to each other is an optical fiber 10d, and an optical communication system including the optical communication devices 20Ad and 20Bd and the optical fiber 10d is represented as an optical communication system 1d. The interface surfaces of the optical communication devices 20Ad and 20Bd are represented as interface surfaces 25Ad and 25Bd, respectively.

Figure 6:
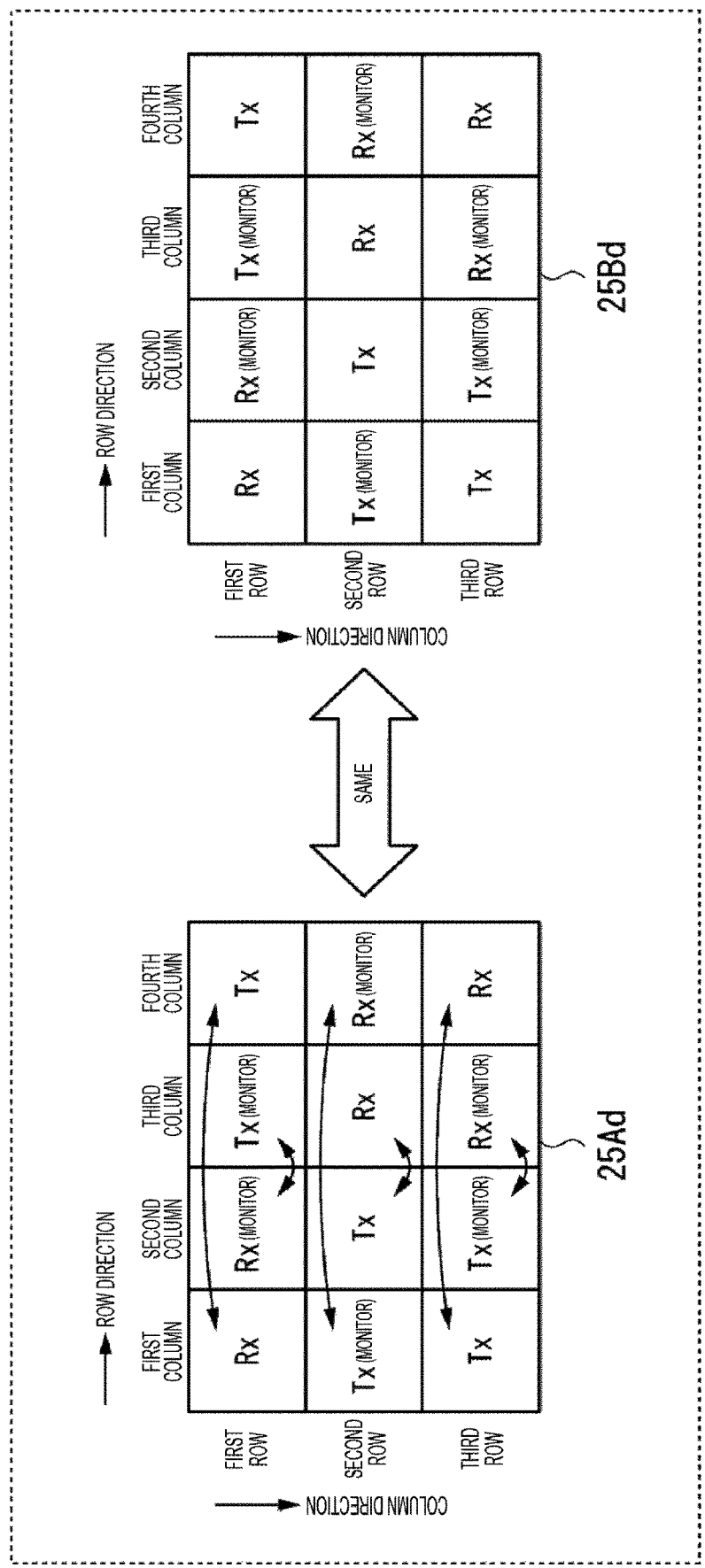
FIG. 6 is a diagram illustrating an arrangement pattern of connection ends of an interface surface of an optical communication device in an extended configuration of the third embodiment.

FIG. 6 is a configuration example of the interface surfaces 25Ad and 25Bd provided with connection ends further to form three rows in the column direction. In this case, N=4, and the optical fiber 10d includes 12 cores 11-1 to 11-12 of 3 rows×4 columns formed in parallel in an untwisted state with respect to the longitudinal direction. In each row of the interface surface 25Ad, pairs of the connection ends of which the sum of column numbers is "5" are arranged to be transmission and reception pairs. In this case, the same device as the optical communication device 20Ad is installed as the optical communication device 20Bd to face the optical communication device 20Ad, whereby the connection end of the interface surface 25Ad and the connection end of the interface surface 25Bd that are in a line-symmetric positional relationship to the vertical line 101 is a transmission and reception pair.

The extended configuration example of the third embodiment described above is expressed in a generalized manner as follows. That is, M is an integer of greater than or equal to 1, N is an even number, and in the optical fiber 10d, cores of M rows×N columns are formed in parallel in an untwisted state with respect to the longitudinal direction. Connection ends are provided in M rows×N columns on the interface surface 25Ad of the optical communication device 20Ad, and the connection ends are provided such that a pair of the connection ends of which the sum of column numbers is N+1 is a transmission and reception pair. In this case, the same device as the optical communication device 20Ac is installed as the optical communication device 20Bc to face the optical communication device 20Ac, whereby the type of transmission and reception of the connection end on the interface surface 25Ad of the optical communication device 20Ad and the type of transmission and reception of the connection end on the interface surface 25Bd of the optical communication device 20Bd are a transmission and reception pair, in which the connection end on the interface surface 25Ad and the connection end on the interface surface 25Bd are in a line-symmetric positional relationship to the vertical line 101.

Since the optical signals sent out by the optical communication devices 20Ad and 20Bd are transmitted by the different cores 11-1, 11-2, . . . , the optical communication devices 20Ad and 20Bd do not need to include multiplexers/demultiplexers. Since the optical signals are transmitted by the respective different cores 11-1, 11-2, . . . , the wavelengths of all the optical signals can be the same wavelength.

Two optical communication devices 20Ad are prepared, and one optical communication device 20Ab is installed at an opposite position, whereby the one optical communication device 20Ad can be used as the optical communication device 20Bb. For that reason, since it is sufficient to manufacture two identical products, the manufacturing cost can be suppressed. Thus, it is possible to perform bidirectional communication at low cost while reducing the wavelengths to be used as compared with the conventional optical communication system.

Fourth Embodiment

Figure 7:
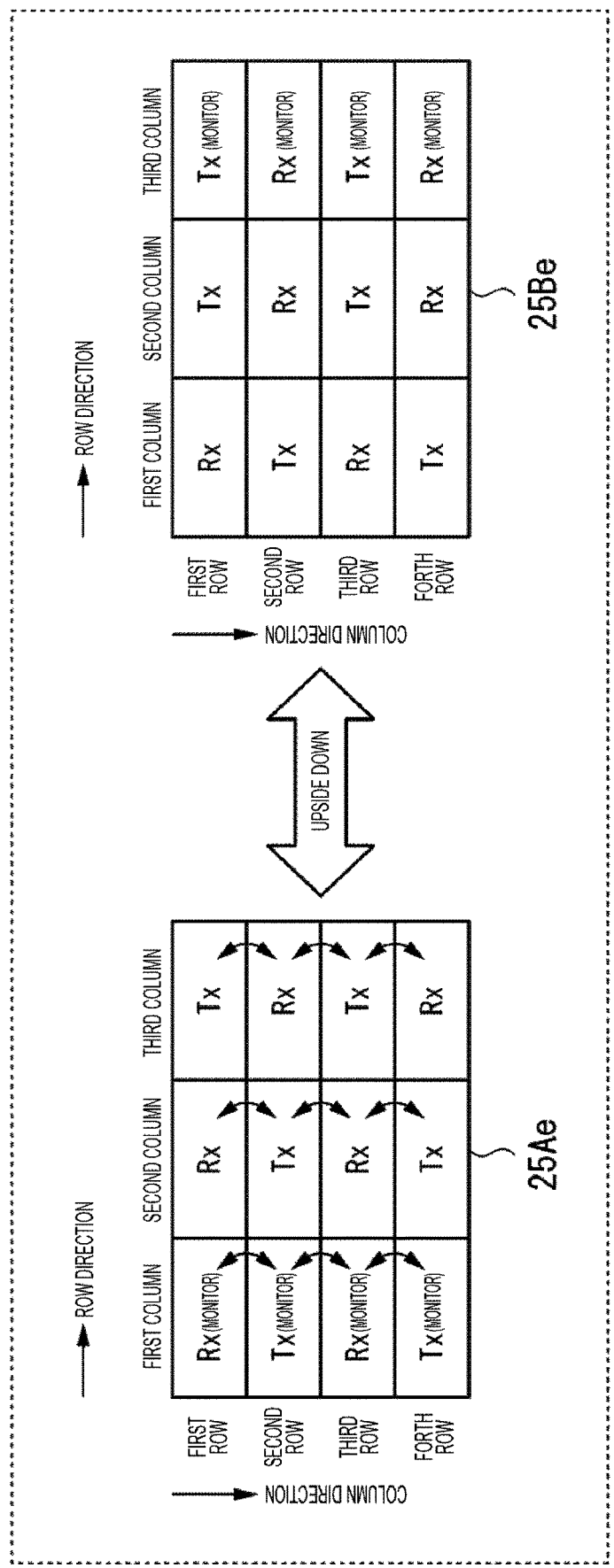
FIG. 7 is a diagram illustrating an arrangement pattern of connection ends on an interface surface of an optical communication device in a fourth embodiment.

FIG. 7 is a diagram illustrating an arrangement of connection ends on interface surfaces 25Ae and 25Be of respective two optical communication devices 20Ae and 20Be included in an optical communication system 1e in a fourth embodiment. Note that the optical communication system 1e includes an optical fiber 10e that connects the optical communication devices 20Ae and 20Be to each other, and the optical fiber 10e includes 12 cores 11-1 to 11-12 formed in parallel in an untwisted state with respect to the longitudinal direction.

As illustrated in the left side diagram of FIG. 7, in the interface surface 25Ae of the optical communication device 20Ae, connection ends are provided such that adjacent connection ends are a transmission and reception pair in the same column. To transmit and receive optical signals bidirectionally to and from the optical communication device 20Ae through each of the 12 cores 11-1 to 11-12 of the optical fiber 10e, as described in the first to third embodiments, in a case where the optical communication devices 20Ae and 20Be are installed on a horizontal plane such that the interface surfaces 25Ae and 25Ae of the respective optical communication devices 20Ae and 20Be face the front, it is necessary to satisfy a condition that the type of transmission and reception of the connection end of the optical communication device 25Ae and the type of transmission and reception of the connection end of the optical communication device 20Be are a transmission and reception pair, in which the connection end of the optical communication device 25Ae and the connection end of the optical communication device 20Be are in a line-symmetric positional relationship with respect to a vertical line 101 to a horizontal plane at a middle position of the interface surfaces 25Ae and 25Ae. When the connection ends are provided in the optical communication device 20Be to satisfy this condition, the connection ends are arranged like the interface surfaces 25Be illustrated in the right side diagram of FIG. 7.

Comparing the arrangement of the connection ends of the interface surfaces 25Ae and 25Be in FIG. 7, the arrangement of the connection ends of the interface surface 25Be of the optical communication device 20Be coincides with the arrangement of the connection ends of the interface surface 25Ae in a case where the optical communication device 20Ae is turned upside down and installed at an opposite position.

Thus, the configuration of the fourth embodiment described above is expressed in a generalized manner as follows. That is, M is an even number, N is an integer of greater than or equal to 1, and in the optical fiber 10e, cores of M rows×N columns are formed in parallel in an untwisted state with respect to the longitudinal direction. Connection ends are provided in M rows×N columns on the interface surface 25Ae of the optical communication device 20Ae, and the connection ends are provided such that a pair of adjacent connection ends in the same column is a transmission and reception pair. In this case, when a device in which the same device as the optical communication device 20Ae that is turned upside down and installed at an opposite position is set as the optical communication device 20Be, the type of transmission and reception of the connection end on the interface surface 25Ae of the optical communication device 20Ae and the type of transmission and reception of the connection end on the interface surface 25Be of the optical communication device 20Be are a transmission and reception pair, in which the connection end on the interface surface 25Ae and the connection end on the interface surface 25Be are in a line-symmetric positional relationship to the vertical line 101.

As a result, since the optical signals sent out by the optical communication devices 20Ae and 20Be are transmitted by the different cores 11-1, 11-2, . . . , the optical communication devices 20Ae and 20Be do not need to include multiplexers/demultiplexers. Since the optical signals are transmitted by the respective different cores 11-1, 11-2, . . . , the wavelengths of all the optical signals can be the same wavelength. Two optical communication devices 20Ae are prepared, and one optical communication device 20Ae is turned upside down and installed at an opposite position, whereby the one optical communication device 20Ae can be used as the optical communication device 20Be. For that reason, it is sufficient that two identical products are manufactured and it is indicated, in a manual or the like, for example, that one product is turned upside down, that is, rotated by 180 degrees with respect to the other product and installed at an opposite position, and thus it is possible to suppress the manufacturing cost. Thus, it is possible to perform bidirectional communication at low cost while reducing the wavelengths to be used as compared with the conventional optical communication system.

Fifth Embodiment

Figure 8:
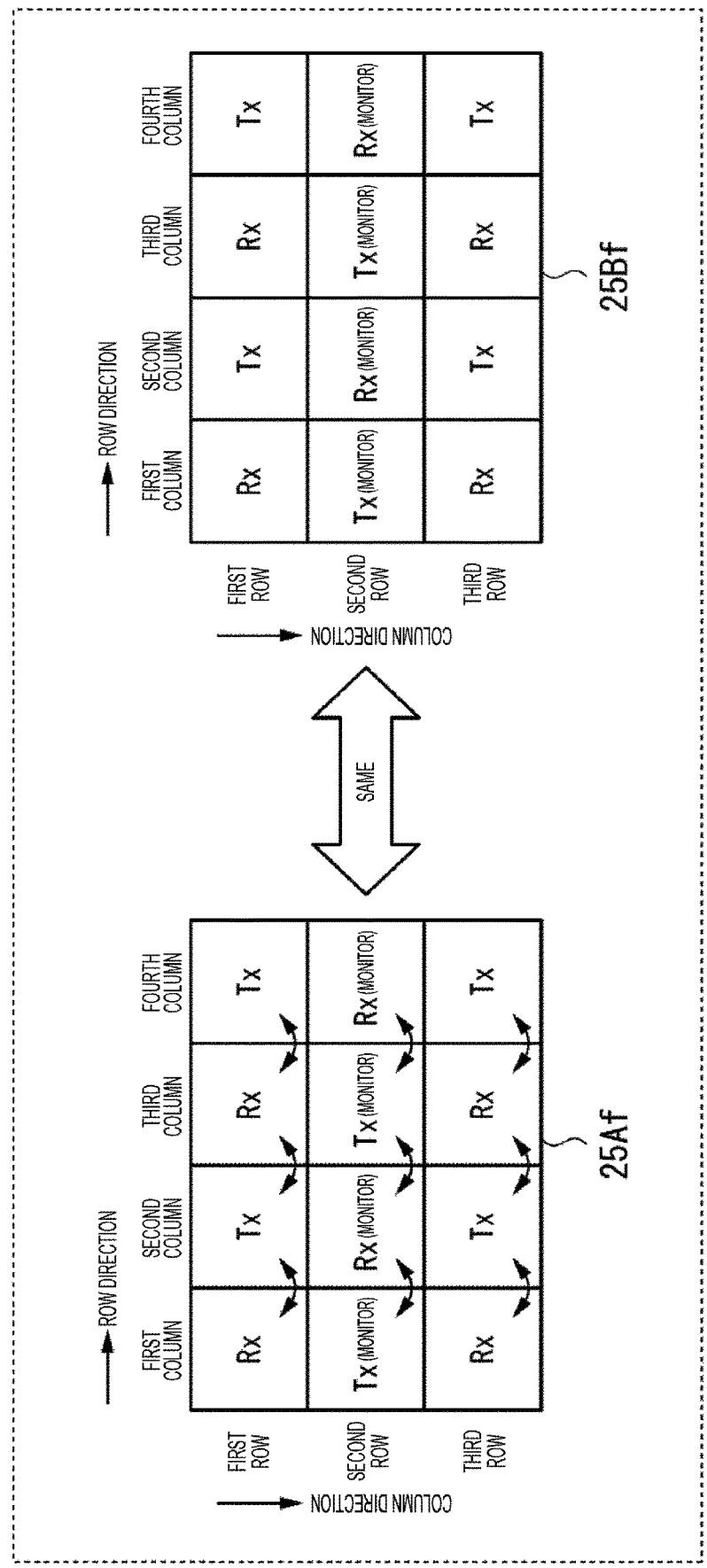
FIG. 8 is a diagram illustrating an arrangement pattern of connection ends on an interface surface of an optical communication device in a fifth embodiment.

FIG. 8 is a diagram illustrating an arrangement of connection ends on interface surfaces 25Af and 25Bf of respective two optical communication devices 20Af and 20Bf included in an optical communication system if in a fifth embodiment. Note that the optical communication system if includes an optical fiber 10f that connects the optical communication devices 20Af and 20Bf to each other, and the optical fiber 10f includes 12 cores 11-1 to 11-12 formed in parallel in an untwisted state with respect to the longitudinal direction.

As illustrated in the left side diagram of FIG. 8, in the interface surface 25Af of the optical communication device 20Af, connection ends are provided such that adjacent connection ends are a transmission and reception pair in the same row. To transmit and receive optical signals bidirectionally to and from the optical communication device 20Af through each of the 12 cores 11-1 to 11-12 of the optical fiber 10f, as described in the first to third embodiments, in a case where the optical communication devices 20Af and 20Bf are installed on a horizontal plane such that the interface surfaces 25Af and 25Af of the respective optical communication devices 20Af and 20Bf face the front, it is necessary to satisfy a condition that the type of transmission and reception of the connection end of the optical communication device 25Af and the type of transmission and reception of the connection end of the optical communication device 20Bf are a transmission and reception pair, in which the connection end of the optical communication device 25Af and the connection end of the optical communication device 20Bf are in a line-symmetric positional relationship with respect to a vertical line 101 to a horizontal plane at a middle position of the interface surfaces 25Af and 25Af. When the connection ends are provided in the optical communication device 20Bf to satisfy this condition, the connection ends are arranged like the interface surfaces 25Bf illustrated in the right side of FIG. 8.

Comparing the arrangement of the connection ends of the interface surfaces 25Af and 25Bf in FIG. 8, the arrangement of the connection ends of the interface surface 25Bf of the optical communication device 20Bf and the arrangement of the connection ends of the interface surface 25Af coincide with each other.

Thus, the configuration of the fifth embodiment described above is expressed in a generalized manner as follows. That is, M is an integer of greater than or equal to 1, N is an even number, and in the optical fiber 10f, cores of M rows×N columns are formed in parallel in an untwisted state with respect to the longitudinal direction. Connection ends are provided in M rows×N columns on the interface surface 25Af of the optical communication device 20Af, and the connection ends are provided such that a pair of adjacent connection ends in the same row is a transmission and reception pair. In this case, when the same device as the optical communication device 20Af is set as the optical communication device 20Bf, the type of transmission and reception of the connection end on the interface surface 25Af of the optical communication device 20Af and the type of transmission and reception of the connection end on the interface surface 25Bf of the optical communication device 20Bf are a transmission and reception pair, in which the connection end on the interface surface 25Af and the connection end on the interface surface 25Bf are in a line-symmetric positional relationship to the vertical line 101.

As a result, since the optical signals sent out by the optical communication devices 20Af and 20Bf are transmitted by the different cores 11-1, 11-2, . . . , the optical communication devices 20Af and 20Bf do not need to include multiplexers/demultiplexers. Since the optical signals are transmitted by the respective different cores 11-1, 11-2, . . . , the wavelengths of all the optical signals can be the same wavelength. Two optical communication devices 20Af are prepared, and one optical communication device 20Af can be used as the optical communication device 20Bf. For that reason, since it is sufficient to manufacture two identical products, the manufacturing cost can be suppressed. Thus, it is possible to perform bidirectional communication at low cost while reducing the wavelengths to be used as compared with the conventional optical communication system.

Combination of Embodiments

Figure 9:
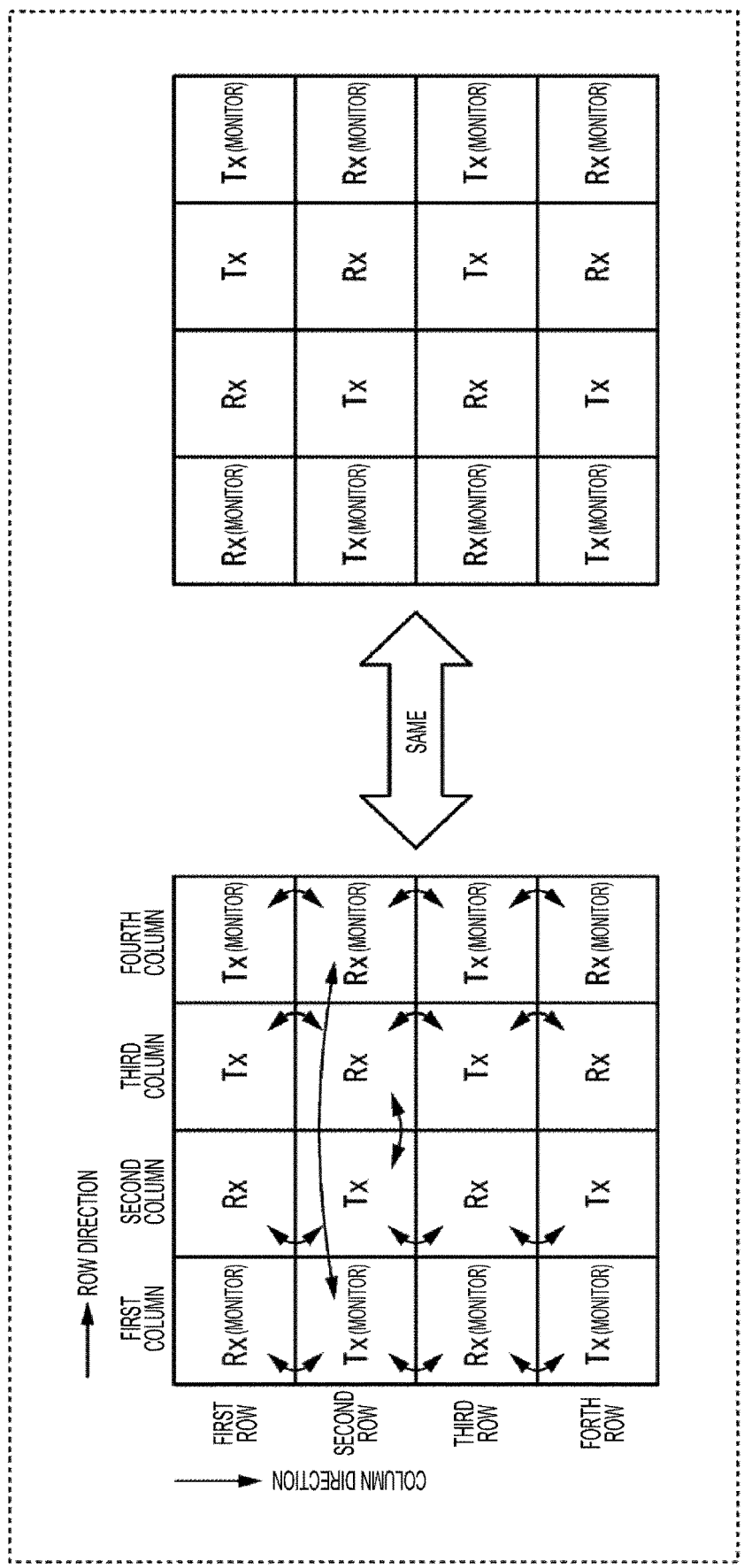
FIG. 9 is a diagram illustrating an arrangement pattern of connection ends obtained by combining the third embodiment and the fourth embodiment.

The third embodiment and the fourth embodiment described above can be applied in combination. For example, both M and N may be even numbers, the connection ends may be arranged in M rows×N columns, the connection ends may be provided in the arrangement pattern of the connection ends of the third embodiment, that is, such that a pair of the connection ends of which the sum of column numbers is N+1 is a transmission and reception pair, for any one row, and with the arrangement of the row as a reference, for other rows, the connection ends may be provided in the arrangement pattern of the connection ends of the fourth embodiment, that is, such that adjacent connection ends are a transmission and reception pair in the same column. With such a configuration, for example, as in the example of the case of M=4 and N=4 illustrated in FIG. 9, it is possible to perform bidirectional communication by preparing two optical communication devices having the same configuration and installing the optical communication devices at opposite positions. Note that the example illustrated in FIG. 9 is an example in which the connection ends are provided in the second row in the arrangement pattern of the connection ends of the third embodiment, that is, such that a pair of the connection ends of which the sum of column numbers is 5 is a transmission and reception pair, and for other rows, with the arrangement of the connection ends in the second row as a reference, the connection ends are provided in the arrangement pattern of the connection ends of the fourth embodiment, that is, such that a pair of adjacent connection ends in the same column is a transmission and reception pair.

Figure 10:
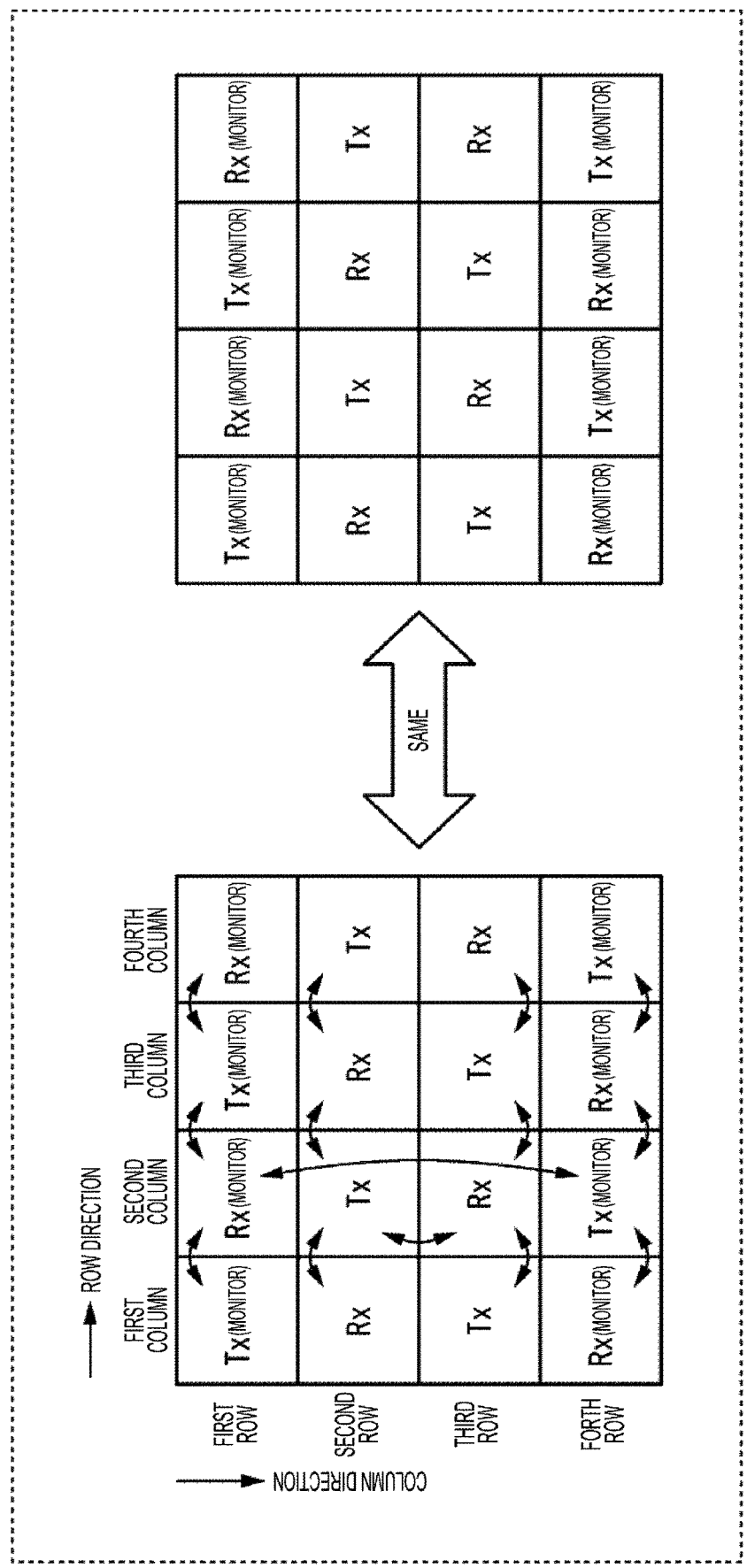
FIG. 10 is a diagram illustrating an arrangement pattern of connection ends obtained by combining the second embodiment and the fifth embodiment.

Note that the second embodiment and the fifth embodiment described above can be applied in combination. For example, both M and N may be even numbers, the connection ends may be arranged in M rows×N columns, the connection ends may be provided in the arrangement pattern of the connection ends of the second embodiment, that is, such that a pair of the connection ends of which the sum of row numbers is M+1 is a transmission and reception pair, for any one column, and with the arrangement of the column as a reference, for other columns, the connection ends may be provided in the arrangement pattern of the connection ends of the fifth embodiment, that is, such that adjacent connection ends are a transmission and reception pair in the same row. With such a configuration, for example, as in the example of the case of M=4 and N=4 illustrated in FIG. 10, it is possible to perform bidirectional communication by preparing two optical communication devices having the same configuration and installing the optical communication devices at opposite positions. Note that the example illustrated in FIG. 10 is an example in which the connection ends are provided in the second column in the arrangement pattern of the connection ends of the second embodiment, that is, such that a pair of the connection ends of which the sum of row numbers is 5 is a transmission and reception pair, and for other columns, with the arrangement of the connection ends in the second column as a reference, the connection ends are provided in the arrangement pattern of the connection ends of the fifth embodiment, that is, such that a pair of adjacent connection ends in the same row is a transmission and reception pair.

Sixth Embodiment

Figure 11:
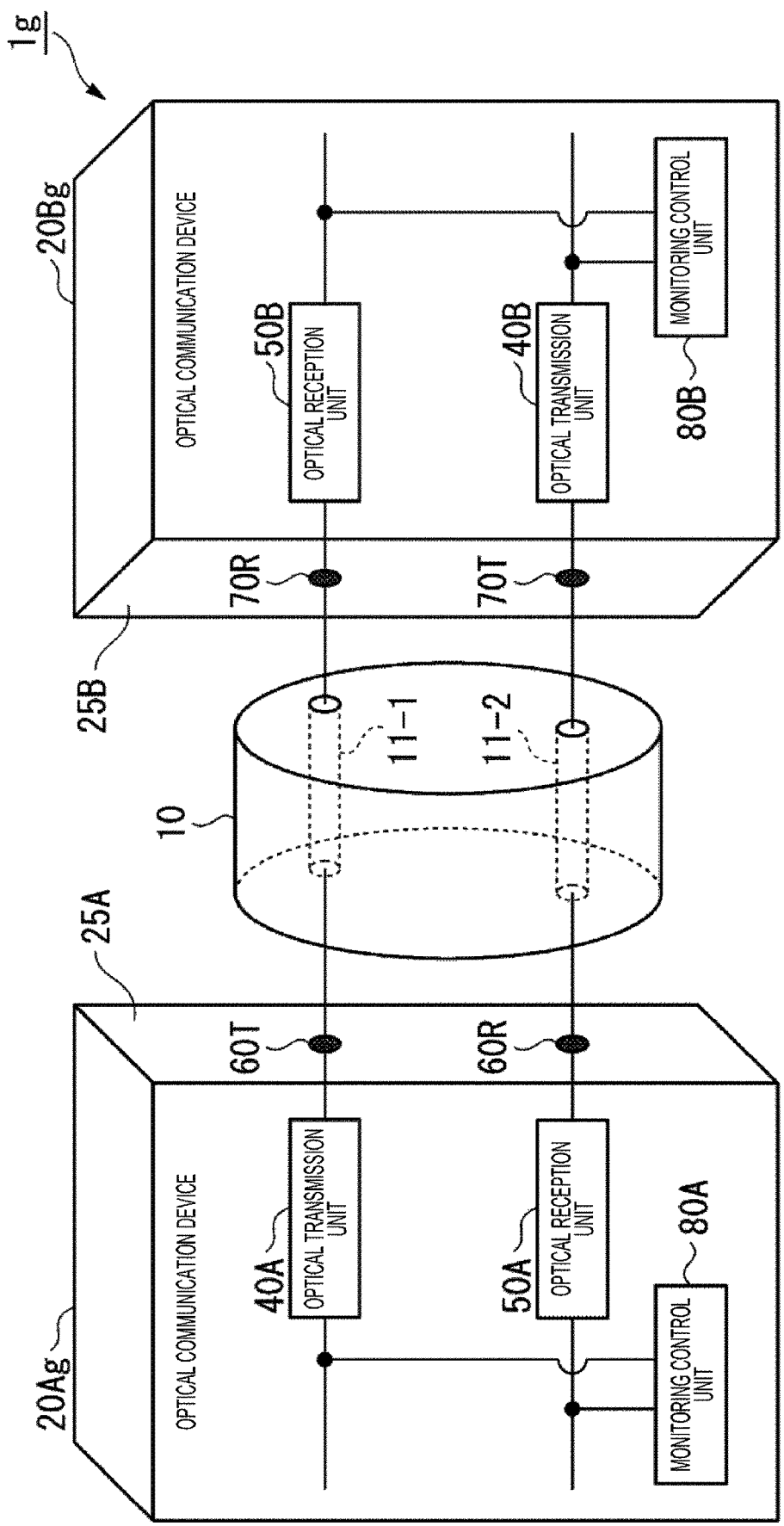
FIG. 11 is a block diagram illustrating a configuration of an optical communication system of a sixth embodiment.

FIG. 11 is a block diagram illustrating a configuration of an optical communication system 1g according to a sixth embodiment. In the sixth embodiment, the same components as those in the first embodiment are denoted by the same reference numerals, and different components will be described below.

The optical communication system 1g includes an optical communication device 20Ag, an optical communication device 20Bg, and an optical fiber 10. The optical communication device 20Ag has a configuration in which a monitoring control unit 80A is added to the optical communication device 20A of the first embodiment. The optical communication device 20Bg has a configuration in which a monitoring control unit 80B is added to the optical communication device 20B of the first embodiment.

The monitoring control unit 80A of the optical communication device 20Ag is connected to an optical transmission unit 40A and an optical reception unit 50A through an electric line. The monitoring control unit 80A changes the wavelength and light intensity of a light source provided inside the optical transmission unit 40A in accordance with an instruction signal of an electrical signal output by itself. As a result, it is possible to change the wavelength and power of an optical signal sent out by the optical transmission unit 40A to a core 11-1.

The monitoring control unit 80B of the optical communication device 20Bg is connected to an optical transmission unit 40B and an optical reception unit 50B through an electric line. The monitoring control unit 80B changes the wavelength and light intensity of a light source included in the optical transmission unit 40B in accordance with an instruction signal of an electrical signal output by itself. As a result, it is possible to change the wavelength and power of an optical signal sent out by the optical transmission unit 40B to a core 11-2.

For example, the monitoring control units 80A and 80B measure changes in the electrical signals output by the optical reception units 50A and 50B respectively connected thereto, thereby detecting information such as states of power and the like of the optical signals sent out by the facing optical transmission units 40B and 40A and states of optical transmission lines. On the basis of the detected information, for example, the monitoring control units 80A and 80B output, to the optical transmission units 40A and 40B respectively connected thereto, instruction signals for changing the wavelengths and light intensities of the light sources. As a result, it is possible to adjust the wavelengths and power of the optical signals sent out by the optical transmission units 40A and 40B to appropriate states.

Note that, as described above, the optical communication system 1g of the sixth embodiment has a configuration in which the monitoring control unit 80A is added to the optical communication device 20A and the monitoring control unit 80A is added to the optical communication device 20B in the configuration of the optical communication system 1 of the first embodiment. Since the monitoring control units 80A and 80B may have the same configuration, in a case where the optical transmission unit 40A and the optical reception unit 50A included in the optical communication device 20A are a transmission and reception pair, two optical communication devices 20Ag are prepared, and one optical communication device 20Ag is installed at an opposite position, whereby the one optical communication device 20Ag can be used as the optical communication device 20Bg. Thus, the optical communication system 1g of the sixth embodiment has an effect similar to that of the optical communication system 1 of the first embodiment, and can monitor operation of the optical communication devices 20Ag and 20Bg and the states of the optical transmission lines without including the monitoring optical transmission units 41A and 41B and the monitoring optical reception units 51A and 51B as in the optical communication system 1a of the second embodiment.

Seventh Embodiment

Figure 12:
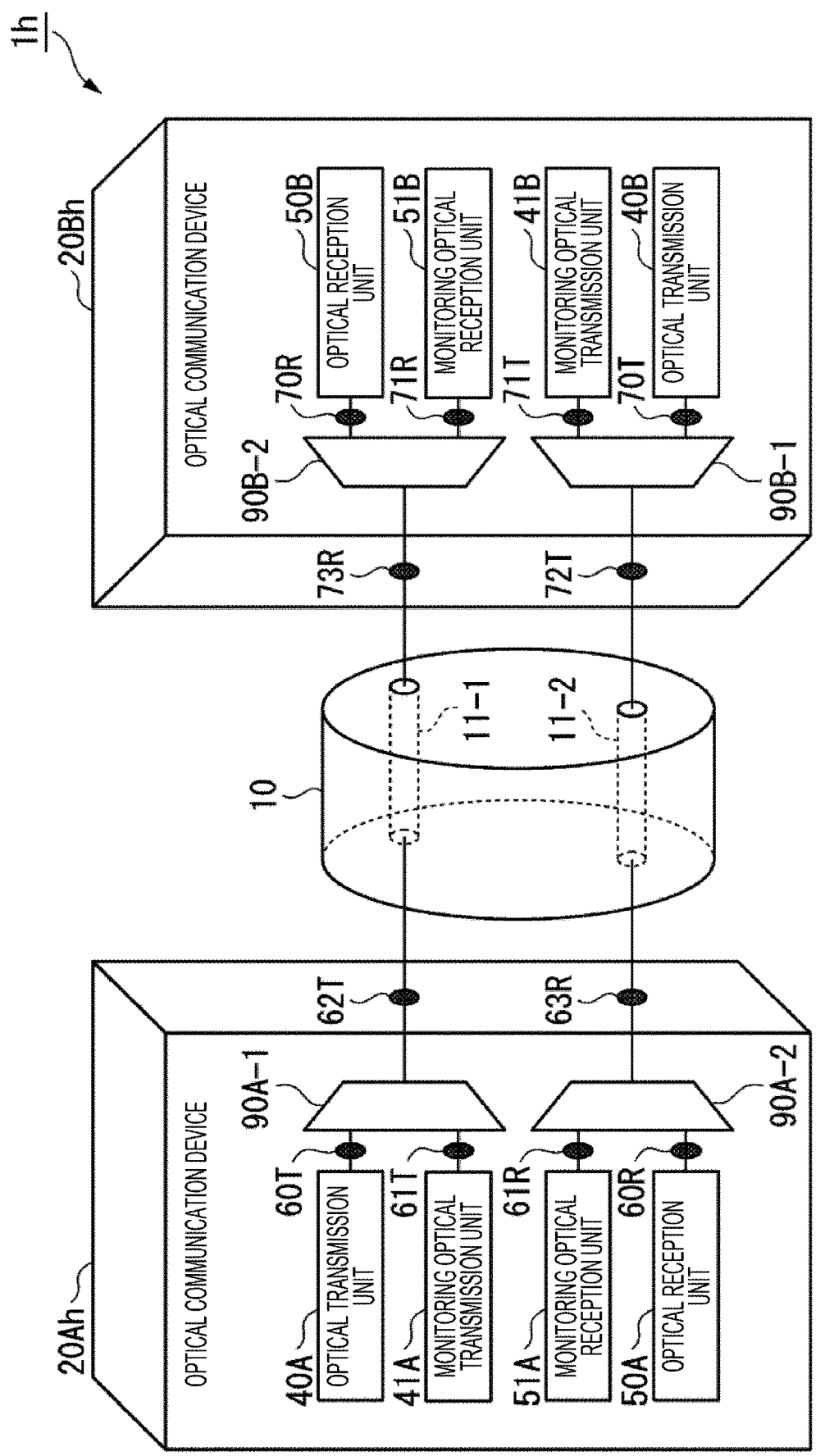
FIG. 12 is a block diagram illustrating a configuration of an optical communication system of a seventh embodiment.
Figure 13:
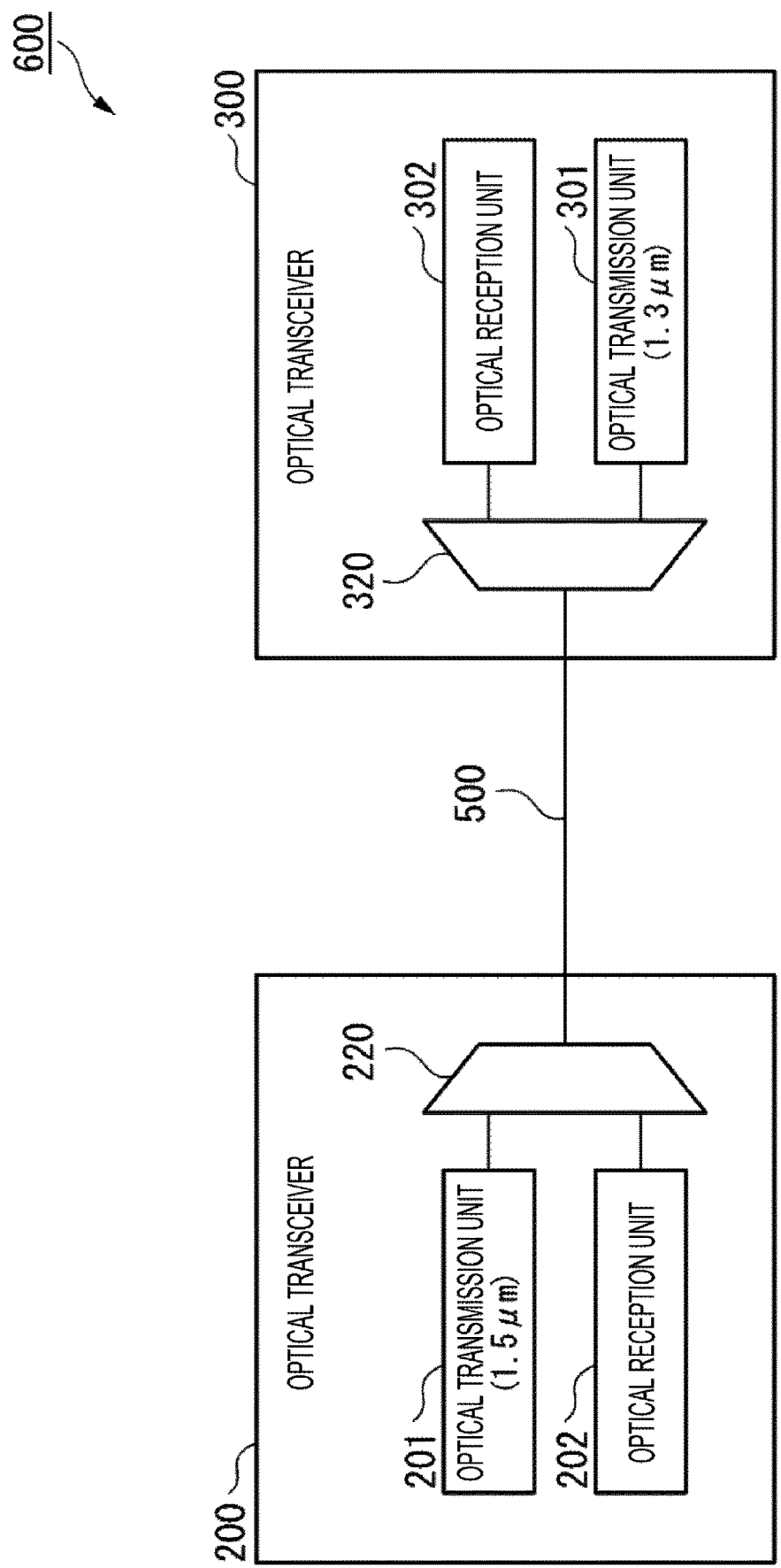
FIG. 13 is a block diagram illustrating a configuration of a conventional optical communication system that performs single-core bidirectional communication.
Figure 14:
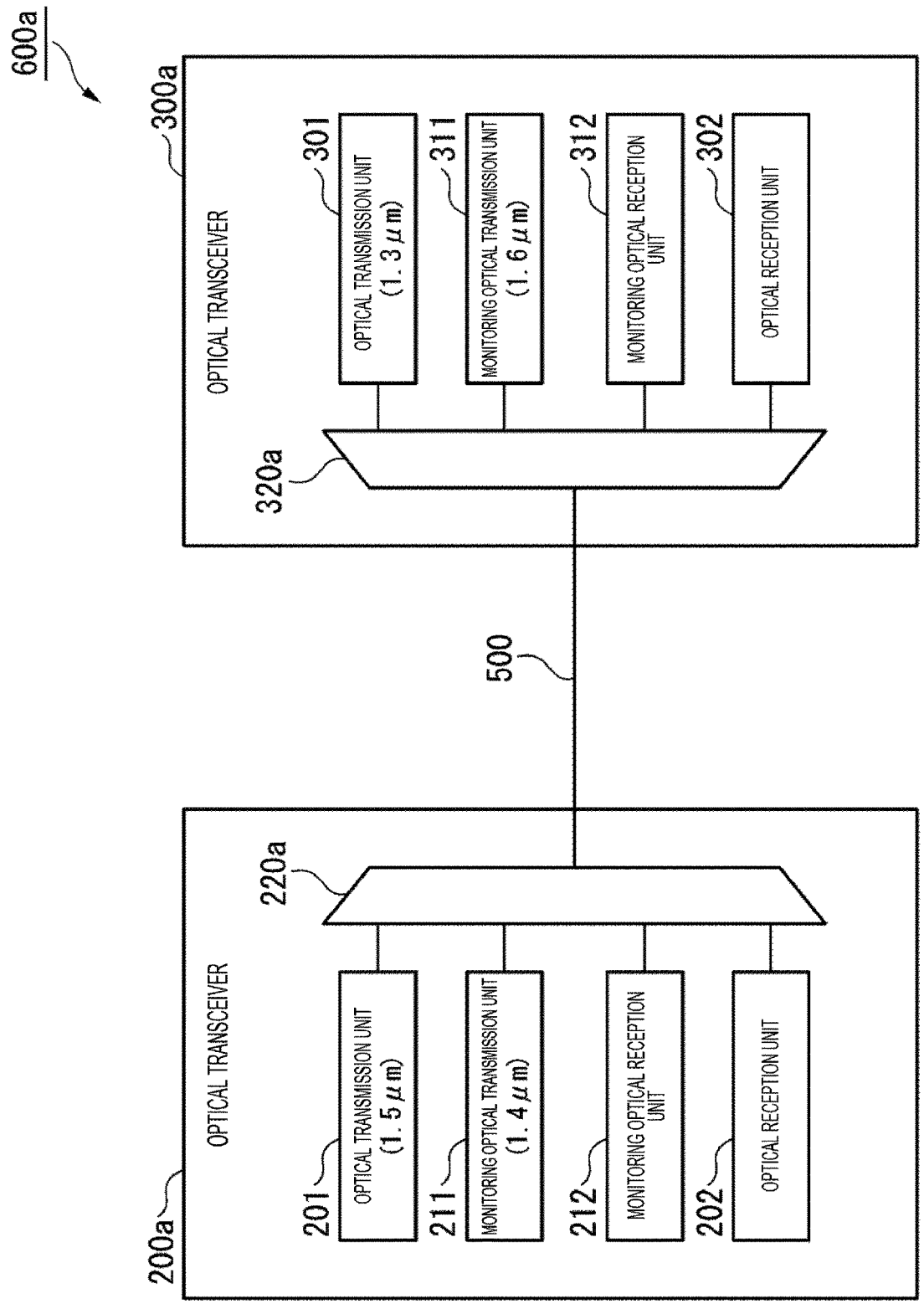
FIG. 14 is a block diagram illustrating a configuration of a conventional optical communication system that performs single-core bidirectional communication accompanied by transmission and reception of an optical signal for monitoring.

FIG. 12 is a block diagram illustrating a configuration of an optical communication system 1h according to a seventh embodiment. In the seventh embodiment, the same components as those in the first and second embodiments are denoted by the same reference numerals, and different components will be described below.

The optical communication system 1h includes an optical communication device 20Ah, an optical communication device 20Bh, and an optical fiber 10. The optical communication devices 20Ah and 20Bh are, for example, optical transceivers. The optical communication device 20Ah includes an optical transmission unit 40A, a monitoring optical transmission unit 41A, a monitoring optical reception unit 51A, an optical reception unit 50A, and two optical couplers 90A-1 and 90A-2. The optical communication device 20Bh includes an optical reception unit 50B, a monitoring optical reception unit 51B, a monitoring optical transmission unit 41B, an optical transmission unit 40B, and two optical couplers 90B-1 and 90B-2. In other words, the optical communication system 1h has a configuration in which, in the optical communication system 1a of the second embodiment, the optical communication device 20Aa further includes the optical couplers 90A-1 and 90A-2, the optical communication device 20Ba further includes the optical couplers 90B-1 and 90B-2, and the optical fiber 10a is replaced with the optical fiber 10 of the first embodiment.

In the optical coupler 90A-1, a connection end 60T of the optical transmission unit 40A and a connection end 61T of the monitoring optical transmission unit 41A that are in an adjacent positional relationship are connected to the input side. The output side of the optical coupler 90A-1 is a new connection end 62T, and the connection end 62T is connected to one end of a core 11-1. In the optical coupler 90A-2, a connection end 61R of the monitoring optical reception unit 51A and a connection end 60R of the optical reception unit 50A that are in an adjacent positional relationship are connected to the output side. The input side of the optical coupler 90A-2 is a new connection end 63R, and the connection end 63R is connected to one end of a core 11-2.

In the optical coupler 90B-1, a connection end 71T of the monitoring optical transmission unit 41B and a connection end 70T of the optical transmission unit 40B that are in an adjacent positional relationship are connected to the input side. The output side of the optical coupler 90B-1 is a new connection end 72T, and the connection end 72T is connected to the other end of the core 11-2. In the optical coupler 90B-2, a connection end 70R of the optical reception unit 50B and a connection end 71R of the monitoring optical reception unit 51B that are in an adjacent positional relationship are connected to the output side. The input side of the optical coupler 90A-2 is a new connection end 73R, and the connection end 73R is connected to the other end of the core 11-1.

The optical transmission unit 40A and the monitoring optical transmission unit 41A included in the optical communication device 20Ah send out optical signals having the same wavelength. The monitoring optical transmission unit 41B and the optical transmission unit 40B included in the optical communication device 20Bh send out optical signals having the same wavelength. However, a bit rate of the optical signal of the data signal sent out by the optical transmission units 40A and 40B is, for example, 10 gigabits/second (Hereinafter, referred to as "Gbps".), and a bit rate of the optical signal for monitoring sent out by the monitoring optical transmission units 41A and 41B is, for example, 100 kilobits/second (Hereinafter referred to as "kbps".).

The optical coupler 90A-1 multiplexes the two optical signals taken in on the input side and outputs a multiplexed optical signal to the output side. The optical transmission unit 40A and the monitoring optical transmission unit 41A connected to the optical coupler 90A-1 send out optical signals of the same wavelength. For that reason, the optical coupler 90A-1 sends out an optical signal having the same wavelength as the optical signals sent out by the optical transmission unit 40A and the monitoring optical transmission unit 41A to the core 11-1.

Similarly, the optical coupler 90B-1 multiplexes the two optical signals taken in on the input side and outputs a multiplexed optical signal to the output side. The monitoring optical transmission unit 41B and the optical transmission unit 40B connected to the optical coupler 90B-1 send out optical signals having the same wavelength. For that reason, the optical coupler 90B-1 sends out an optical signal having the same wavelength as the optical signals sent out by the monitoring optical transmission unit 41B and the optical transmission unit 40B to the core 11-2.

The optical couplers 90A-2 and 90B-2 demultiplex the optical signal taken in on the input side into two without considering the wavelength and output demultiplexed optical signals to the output side. For that reason, the optical reception unit 50B and the monitoring optical reception unit 51B connected to the optical coupler 90B-2 receive the same optical signal in which the optical signals sent out by the optical transmission unit 40A and the monitoring optical transmission unit 41A are mixed. Similarly, the monitoring optical reception unit 51A and the optical reception unit 50A connected to the optical coupler 90A-2 receive the same optical signal in which the optical signals sent out by the monitoring optical transmission unit 41B and the optical transmission unit 40B are mixed.

The monitoring optical reception units 51A and 51B convert the received optical signal into an electrical signal, and then detect an electrical signal for monitoring of 100 kbps that is a low-frequency electrical signal by a method of extracting a low-frequency electrical signal from the converted electrical signal using a low-pass filter. Instead of the method using the low-pass filter, the following method may be used. That is, the monitoring optical reception units 51A and 51B may include a photodetector having a low response speed, and may detect an electrical signal for monitoring of 100 kbps that is a low rate by a method of detecting an electrical signal of a low rate by the photodetector having the low response speed.

According to the configuration of the seventh embodiment described above, in a case where connection ends of types of transmission of which types of information included in optical signals are different for data and for monitoring are in an adjacent positional relationship, such as the connection ends 60T and 61T of the optical transmission unit 40A and the monitoring optical transmission unit 41A, or the connection ends 71T and 70T of the monitoring optical transmission unit 41B and the optical transmission unit 40B, it is possible to reduce the number of cores 11-1 and 11-2 to be used by multiplexing and transmitting optical signals sent out by these by the optical couplers 90A-1 and 90B-1. Since the optical signals sent out by the optical couplers 90A-1 and 90B-1 are transmitted by the different cores 11-1 and 11-2, the wavelength of the optical signals sent out by the optical transmission unit 40A and the monitoring optical transmission unit 41A and the wavelength of the optical signals sent out by the monitoring optical transmission unit 41B and the optical transmission unit 40B can be the same wavelength.

When the connection ends on the transmission side have an adjacent positional relationship, the connection ends on the opposite reception side also have an adjacent positional relationship. Thus, the connection ends on the reception side also have an adjacent positional relationship. For that reason, the received optical signal is demultiplexed into two by the optical couplers 90A-2 and 90B-2, and the method of detecting the electrical signal for monitoring of 100 kbps is applied as described above, whereby it is possible to perform monitoring of operation of the optical communication devices 20Ah and 20Bh and the optical transmission paths, using the optical signal for monitoring, with a small number of cores, similarly to the optical communication system 1a of the second embodiment.

Note that, as described above, the optical communication system 1h of the seventh embodiment has a configuration in which the optical couplers 90A-1 and 90A-2 are added to the optical communication device 20Aa, the optical couplers 90B-1 and 90B-2 are added to the optical communication device 20Ba, and the optical fiber 10a is replaced with the optical fiber 10 in the configuration of the optical communication system 1a of the second embodiment. In this case, in a case where the optical transmission unit 40A and the optical reception unit 50A of the optical communication device 20Ah are a transmission and reception pair, and the monitoring optical transmission unit 41 and the monitoring optical reception unit 51A are a transmission and reception pair, two optical communication devices 20Ah are prepared, and one optical communication device 20Ah is turned upside down and installed at an opposite position, whereby the one optical communication device 20Ah can be used as the optical communication device 20Bh. Thus, the optical communication system 1g of the seventh embodiment has an effect similar to that of the optical communication system 1a of the second embodiment with a smaller number of cores than that of the second embodiment. Since the configuration of the seventh embodiment can be applied if connection ends of types of transmission of which types of information included in optical signals are different for data and for monitoring are in an adjacent positional relationship, the configuration of the seventh embodiment can be applied to, for example, the arrangement of connection ends illustrated in FIG. 3(c) and a configuration having a positional relationship similar to that in the second to sixth embodiments other than that.

Note that, in the first to seventh embodiments, in the optical fibers 10, 10a, 10b, 10d, 10e, and 10f, the plurality of cores 11-1, 11-2, . . . is formed in parallel in the longitudinal direction in an untwisted state. For that reason, in a case where both ends of the optical fibers 10, 10a, 10b, 10d, 10e, and 10f are viewed, positions at both ends of the individual cores 11-1, 11-2, . . . are easily specified, and by connecting the connection ends in accordance with the arrangement of the connection ends, both ends can be connected to each other to be a transmission and reception pair without errors. Note that, in the optical fiber 10a illustrated in FIGS. 2 and 5, the arrangement of the cores 11-1 to 11-4 in the cross section is an arrangement that does not coincide with the arrangement of the connection ends 60T, 61T, 61R, and 60R and the arrangement of the connection ends 70R, 71R, 71T, and 70T from the relationship of the composition of the drawings, but the cores 11-1 to 11-4 are formed in a linear arrangement that coincides with the arrangement of the connection ends 60T, 61T, 61R, and 60R and the arrangement of the connection ends 70R, 71R, 71T, and 70T. Even in a case where the connection ends are provided in M rows×N columns, the cores 11-1, 11-2, . . . are formed in M rows×N columns to be the same as the arrangement of the connection ends.

Although embodiments of the present invention have been described in detail with reference to the drawings so far, specific configurations are not limited to these embodiments, and include designs and the like without departing from the spirit of the present invention.

INDUSTRIAL APPLICABILITY

The present invention can be applied to an optical transceiver that performs bidirectional communication.

REFERENCE SIGNS LIST 1 optical communication system
10 optical fiber
11-1, 11-2 core
20A, 20B optical communication device
25A, 25B interface surface
40A, 40B optical transmission unit
50A, 50B optical reception unit
60T, 60R, 70T, 70R connection end

The invention claimed is:

1. An installation method of an optical communication device in an optical communication system including: an optical fiber including a plurality of cores formed in parallel to a longitudinal direction; a first optical communication device including an optical transmitter, a monitoring optical transmitter, an optical receiver and a monitoring optical receiver and provided with connection ends of the optical transmitter, the monitoring optical transmitter, the optical receiver and the monitoring optical receiver on an interface surface of the first optical communication device; and a second optical communication device including an optical transmitter, a monitoring optical transmitter, an optical receiver and a monitoring optical receiver and provided with connection ends of the optical transmitter, the monitoring optical transmitter, the optical receiver and the monitoring optical receiver of the second optical communication device, wherein the optical transmitter of the first optical communication device and the optical transmitter of the second optical communication device are a functional part that transmits a main signal, wherein the monitoring optical transmitter of the first optical communication device and the monitoring optical transmitter of the second optical communication device are a functional part that transmits an optical signals for monitoring, wherein the optical receiver of the first optical communication device and the optical receiver of the second optical communication device are a functional part that receives the main signal, wherein the monitoring optical receiver of the first optical communication device and the monitoring optical receiver of the second optical communication device are a functional part that receives the optical signals for monitoring, wherein the connection ends are provided in the first optical communication device and the second optical communication device in an arrangement in which a type of transmission and reception of one of the connection ends of the first optical communication device and a type of transmission and reception of one of the connection ends of the second optical communication device are a transmission and reception pair according to signal type, the one of the connection ends of the first optical communication device and the one of the connection ends of the second optical communication device being in a line-symmetric positional relationship with respect to a vertical line to a horizontal plane of when the first optical communication device and the second optical communication device are installed on the horizontal plane such that the interface surface of the first optical communication device and the interface surface of the second optical communication device face a front, the installation method comprising:

connecting the connection ends of the first optical communication device to one ends of the cores different from each other; and installing the second optical communication device at a position facing the first optical communication device, and connecting, to other ends of the cores, connection ends of the second optical communication device that are transmission and reception pairs according to the signal type to the connection ends connected to the one ends of the cores.

2. The installation method of an optical communication device according to claim 1, wherein the optical transmitter of the first optical communication device and the optical transmitter of the second optical communication device transmit optical signals of an identical wavelength.

3. The installation method of an optical communication device according to claim 1, wherein a row direction is a horizontal direction, a column direction is a vertical direction, the cores of the optical fiber are formed in M rows×N columns under a condition that M is an even number and N is an integer of greater than or equal to 1, on the interface surface of the first optical communication device, the connection ends are arranged in M rows×N columns, and a pair of the connection ends of which a sum of row numbers is M+1 is provided to be a transmission and reception pair according to the signal type, and a device in which a device identical to the first optical communication device is turned upside down is installed as the second optical communication device at a position facing the first optical communication device.

4. The installation method of an optical communication device according to claim 1, wherein a row direction is a horizontal direction, a column direction is a vertical direction, the cores of the optical fiber are formed in M rows×N columns under a condition that M is an integer of greater than or equal to 1 and N is an even number, on the interface surface of the first optical communication device, the connection ends are arranged in M rows×N columns, and a pair of the connection ends of which a sum of column numbers is N+1 is provided to be a transmission and reception pair according to the signal type, and a device identical to the first optical communication device is installed as the second optical communication device at a position facing the first optical communication device.

5. The installation method of an optical communication device according to claim 1, wherein a row direction is a horizontal direction, a column direction is a vertical direction, the cores of the optical fiber are formed in M rows×N columns under a condition that M is an even number and N is an integer of greater than or equal to 1, on the interface surface of the first optical communication device, the connection ends are arranged in M rows×N columns, and a pair of the connection ends adjacent to each other in an identical column is provided to be a transmission and reception pair according to the signal type, and a device in which a device identical to the first optical communication device is turned upside down is installed as the second optical communication device at a position facing the first optical communication device.

6. The installation method of an optical communication device according to claim 1, wherein a row direction is a horizontal direction, a column direction is a vertical direction, the cores of the optical fiber are formed in M rows×N columns under a condition that M is an integer of greater than or equal to 1 and N is an even number, on the interface surface of the first optical communication device, the connection ends are arranged in M rows×N columns, and a pair of the connection ends adjacent to each other in an identical row is provided to be a transmission and reception pair according to the signal type, and a device identical to the first optical communication device is installed as the second optical communication device at a position facing the first optical communication device.

7. The installation method of an optical communication device according to claim 1, wherein in the first optical communication device, in a case where a connection end of the optical transmitter and a connection end of the monitoring optical transmitter are adjacent to each other, a first optical coupler is further included, the two adjacent connection ends are connected to an input side of the first optical coupler, and an output side of the first optical coupler is connected to one end of one of the cores, in the second optical communication device, a second optical coupler is further included, a connection end of the first-optical receiver and a connection end of the monitoring optical receiver are connected to an output side of the second optical coupler, and an input side of the second optical coupler is connected to another end of the one of the cores of which the first optical coupler is connected to the one end, and the optical transmitter of the first optical communication device and the monitoring optical transmitter of the first optical communication device connected to the first optical coupler transmit optical signals having an identical wavelength at different bit rates.

8. An optical communication system comprising:

an optical fiber including a plurality of cores formed in parallel to a longitudinal direction;

a first optical communication device including an optical transmitter, a monitoring optical transmitter, an optical receiver and a monitoring optical receiver, and provided with connection ends of the optical transmitter, the monitoring optical transmitter, the optical receiver and the monitoring optical receiver each connected to one end of any one of the cores on an interface surface; and a second optical communication device including an optical transmitter, a monitoring optical transmitter, an optical receiver and a monitoring optical receiver, and provided with connection ends of the optical transmitter, the monitoring optical transmitter, the optical receiver and the monitoring optical receiver each connected to another end of any one of the cores on an interface surface, wherein the optical transmitter of the first optical communication device and the optical transmitter of the second optical communication device are a functional part that transmits a main signal, wherein the monitoring optical transmitter of the first optical communication device and the optical transmitter of the second optical communication device are a functional part that transmits an optical signals for monitoring, wherein the optical receiver of the first optical communication device and the optical transmitter of the second optical communication device are a functional part that receives the main signal, wherein the monitoring optical receiver the first optical c communication device and the optical transmitter of the second optical communication device are a functional part that receives the optical signals for monitoring, wherein the connection ends are provided in an arrangement in which a type of transmission and reception of one of the connection ends of the first optical communication device and a type of transmission and reception of one of the connection ends of the second optical communication device are a transmission and reception pair according to signal type, the one of the connection ends of the first optical communication device and the one of the connection ends of the second optical communication device being in a line-symmetric positional relationship with respect to a vertical line to a horizontal plane of when the first optical communication device and the second optical communication device are installed on the horizontal plane such that the interface surfaces of the first optical communication device and the interface surface of the second optical communication device face a front.

* * * * *